United States Patent

Kamite et al.

[11] Patent Number: 5,620,642
[45] Date of Patent: Apr. 15, 1997

[54] SIMULATED WOOD PRODUCT MANUFACTURING METHOD AND SIMULATED WOOD PRODUCT

[75] Inventors: Masayuki Kamite; Masami Katoh, both of Tokyo, Japan

[73] Assignee: Misawa Homes Co., Ltd., Tokyo, Japan

[21] Appl. No.: 331,509

[22] PCT Filed: Mar. 4, 1994

[86] PCT No.: PCT/JP94/00351

§ 371 Date: Oct. 20, 1994

§ 102(e) Date: Oct. 20, 1994

[87] PCT Pub. No.: WO94/20280

PCT Pub. Date: Sep. 15, 1994

[30] Foreign Application Priority Data

Mar. 5, 1993 [JP] Japan ......................... 5-45544

[51] Int. Cl.$^6$ .............. B29B 9/00; B29C 47/00; B29C 45/00
[52] U.S. Cl. .................... 264/115; 264/109; 264/122; 428/407
[58] Field of Search ...................... 264/115, 122, 264/109; 428/403, 407

[56] References Cited

U.S. PATENT DOCUMENTS

| Re. 32,329 | 1/1987 | Paszner | 264/115 |
| 4,505,869 | 3/1985 | Nishibori | 264/115 |

FOREIGN PATENT DOCUMENTS

| 63-21122A | 1/1988 | Japan . |
| 5-169407A | 7/1993 | Japan . |
| 5-177610A | 7/1993 | Japan . |
| 6-39893A | 2/1994 | Japan . |
| 6-41475A | 2/1994 | Japan . |
| 6-41317A | 2/1994 | Japan . |
| 6-39818A | 2/1994 | Japan . |
| 6-42135A | 2/1994 | Japan . |
| 6-41318A | 2/1994 | Japan . |
| 6-41316A | 2/1994 | Japan . |
| 6-134946A | 5/1994 | Japan . |
| 6-167170A | 6/1994 | Japan . |
| 6-170910A | 6/1994 | Japan . |
| 6-257351A | 9/1994 | Japan . |
| 6-257353A | 9/1994 | Japan . |
| 6-257352A | 9/1994 | Japan . |
| 6-256528A | 9/1994 | Japan . |
| 6-255296A | 9/1994 | Japan . |
| 6-257259A | 9/1994 | Japan . |
| 6-255294A | 9/1994 | Japan . |
| 6-254936A | 9/1994 | Japan . |
| 6-257236A | 9/1994 | Japan . |
| 6-257278A | 9/1994 | Japan . |

*Primary Examiner*—Mary Lynn Theisen
*Attorney, Agent, or Firm*—Ronald J. Kubovcik; James C. Lydon

[57] ABSTRACT

A method of manufacturing a simulated wood product which has not only a texture similar to wood, but also exhibits a pattern similar to the grain of natural wood depending on molding conditions, and such a simulated wood product itself. Specifically, pulverized dust 102 obtained by pulverizing a cellulose material as raw materials is subjected to a trituration process to produce powdery particles 111, 121 having an increased bulk specific gravity, surface particles 112, 122 smaller in size and harder than the powdery particles are fixed to outer circumferential surfaces of the powdery particles to produce fixed particles 110, 120, a resin and a pigment are mixed with the fixed particles, and a resultant mixture is melted to be later or simultaneously molded into the desired shape by extrusion or injection molding.

23 Claims, 7 Drawing Sheets

SIMULATED WOOD PRODUCT MANUFACTURING METHOD AND SIMULATED WOOD PRODUCT

TECHNICAL FIELD

The present invention relates to a simulated wood product manufacturing method and a simulated wood product, and more particularly to a method of manufacturing a product having a wood-like feeling, in particular, a simulated wood product close to one made of natural wood including an outer appearance, by using as raw materials pulverized dust of a cellulose material, and to such a simulated wood product.

BACKGROUND ART

Recently, it has been attempted to finish the surfaces of various furnitures or commodities with a feeling of natural wood by imparting, to synthetic resin moldings, surface characteristics and color tones close to those of natural wood.

Such a simulated wood resin product close to one made of natural wood has been manufactured as follows. For coloring the product in a color tone similar to that of natural wood to present aspects of that wood, a predetermined amount of wood dust and a pigment corresponding to the desired color tone have been added to a molding resin material when a synthetic resin molding is molded, so that the resin molding has a color tone and a look close to those of the natural wood of interest.

Alternatively, for giving only the surface of a product aspects like natural wood, a predetermined amount of wood dust has been added to a paint when a surface coating or film is formed, for example, so that the surface of a resin molding has a color tone and a took close to those of the natural wood of interest.

Wood dust added to a molding resin material is often improved so as not to generate wood vinegar gas in a molding machine during the resin molding for the purpose of increasing dispersity of wood dust in a mixture with resin. Known typical wood dust is surface ground dust of particle boards whose surfaces are hardened by a treatment using phenol or urea resin.

The primary features of surface ground dust of particle boards are that the dust is fine, has less cilia on the surface, and has a granular shape providing a high smoothness. Thus, because of being fine and having a high smoothness, surface ground dust is regarded as wood dust which is satisfactorily dispersed and mixed in powdery resin materials.

On the other hand, wood dust obtained by directly pulverizing wood into fine dust has had a disadvantage that the pulverizing efficiency is low regardless of whether the wood dust is pulverized by a dry or wet pulverizer, and a great amount of large-sized wood dust remain in the pulverized dust even after the pulverizing process for a long time. Also, this type of wood dust is not granular in shape, and most of the dust has fibers projecting like whiskers such that even if the dust size measured along the minor axis is several microns, the dust is long along the major axis in the form of cilia. When mixed in a resin material before use, therefore, wood dust is often mutually tangled to produce an agglomerated state and hence is not uniformly dispersed in the resin material. Still another disadvantage is that since pulverized wood dust is largely varied in size, molded resin products are more likely to cause molding distortions or other defects, and the mechanical strength is different from part to part.

For the above disadvantages, wood dust obtained by directly pulverizing wood into fine dust is thought as having limitations in terms of mixing, color and quality control when used as wood dust to be added in a molding resin material.

At the present, however, resin moldings produced by the conventional methods cannot have uniform wood-like aspects in themselves even when surface ground dust of particle boards is used as wood dust to be added. This is because the surface ground dust does not exhibit uniform woody characteristics due to differences in material characteristics of the particle boards and, in addition, the dust is liable to vary in size depending on grinding means, e.g., due to differences in mesh of sand paper used. Accordingly, wood dust obtained by directly pulverizing wood into fine dust and drying the same must be employed in practical situations.

Further, when the resin molding is shaped into the form of a plate, for example, by the extrusion OF injection molding process to manufacture wooden-like plate products, a pigment having a color tone suitable to provide a wood-like feeling is of course added to a resin material in advance. A part of the pigment which has not been sufficiently dispersed in the resin flows through the resin during the molding, thereby forming strips on the molding surface. However, the stripes thus formed are so uniform and mechanical that the resultant surface pattern is far from the grain of natural wool and is easily noticed as one formed artificially using a pigment.

The present invention has been accomplished in view of the state of the art described above, and its object is to provide a method of manufacturing a wooden-like product which has on its surface a pattern very close to the grain of natural wood and also has aspects, including a touch feeling, close to those of natural wood, as well as such a wooden-like product.

SUMMARY OF THE INVENTION

The simulated wood product manufacturing method of the present invention includes the steps of subjecting pulverized dust obtained by pulverizing a cellulose material as raw materials to a trituration process to produce powdery particles having an increased bulk specific gravity, fixing surface particles smaller in size and harder than the powdery particles to outer circumferential surfaces of the powdery particles to produce fixed particles, mixing a resin and a pigment with the fixed particles, and melting a resultant mixture to be later or simultaneously molded into the desired shape by extrusion or injection molding.

The simulated wood product manufacturing method of the present invention comprises the steps of subjecting pulverized dust obtained by pulverizing a cellulose material as raw materials to a trituration process to produce powdery particles having an increased bulk specific gravity, fixing surface particles smaller in size and harder than the powdery particles to outer circumferential surfaces of the powdery particles to produce fixed particles, mixing a resin and a pigment with the fixed particles, and melting a resultant mixture to be later or simultaneously molded into the desired shape by extrusion or injection molding.

The pulverized dust obtained by pulverizing the cellulose material as raw materials is not granular in shape as it is, and most of the dust has fibers projecting like whiskers. When mixed in a resin material before use, therefore, whisker-like fibers are often tangled with each other to produce an agglomerated state, and hence the pulverized dust is not uniformly dispersed in the resin material.

By further pulverizing the the pulverized dust with the trituration process to produce the powdery particles having the increased bulk specific gravity as in the present invention, the powdery particles can be uniformly dispersed in the resin material without tangling together. The powdery particles means herein particles which are resulted by removing the whisker-like fibers projecting from the pulverized dust or pressing them against the dust surface so that no whisker-like fibers are present on the pulverized dust.

While the powdery particles thus obtained can be used as such by directly mixing them in a resin and molding a resultant mixture, if the powdery particles are directly mixed in the resin, characteristics or functions of the molding are determined by only the characteristics or functions of the powdery particles and the resin. Particularly, such direct mixing has accompanied with the fact that the working efficiency is reduced, a seizing occurs during the extrusion, or the molding becomes more breakable under influences of softness or poor fluidity of the powdery particles.

In view of the above, by fixing the surface particles, which are smaller in size and harder than the powdery particles, to the outer circumferential surfaces of the powdery particles to produce the fixed particles, fluidity can be increased for an improvement in the working efficiency, and the characteristics of the molding can be changed upon selection of the surface particles. Particularly, by selectively using any of surface particles having different characteristics such as electrical properties, chemical properties and heat resistance, any of those characteristics can be imparted to a wooden-like product as the final molding.

In the present invention, a mixture of the fixed particles with a resin and a pigment is finally molded into the desired shape by extrusion or injection molding, thereby giving the molding a wood-like feeling. Particularly, when the pigment may flow through the resin during the extrusion or injection molding, the molding surface exhibits a pattern of the grain very close to the natural grain, in addition to a wood-like feeling.

As the cellulose material as raw materials, bagasse, straws of rice plants, etc. can be employed besides wood. The use of wood is however advantageous in that materials are easily available and wood chips or sawdust generated in, e.g., building houses can be used.

The trituration process for increasing the bulk specific gravity is to process the pulverized dust which is not granular in shape and most of which has fibers projecting like whiskers, so that the unnecessary whisker-like fiber portions are eliminated. Any type of processing machine which can eliminate the unnecessary whisker-like fiber portions is applicable. The trituration process by a ball mill having pulverizing balls is however advantageous in that the particle size can be made uniform, the whisker-like fiber portions can be eliminated, and further the surface particles can be simultaneously fixed by adding the surface particles into the ball mill.

The powdery particles produced with the trituration process have no whisker-like projecting found on the pulverized dust and, therefore, elongation or contraction of the powdery particles due to absorbing or releasing water (including moisture) or a solvent is remarkably reduced as opposed to wood dust used conventionally. As a result, the wooden-like product containing the powdery particles is very superior in dimensional stability.

Any type of surface particles can be employed so long as they are smaller in size and harder than the powdery particles. For example, one or more inorganic, metallic and plastic materials can be used.

Particularly, when a white inorganic pigment is used as the surface particles, the fixed particles are colored white, and these white fixed particles can be used in cases of not only making the molding similar to whitish wood, but also making the molding similar to blackish or blown wood by employing other pigments in corresponding colors when the molding is molded.

Further, when an inorganic pigment is used as the surface particles, the heat resistance of the simulated wood product is improved and thermal influences during the molding are reduced as compared with the case of molding a mixture of simple powdery particles and other components.

When mixing the fixed particles thus produced with a resin and a pigment and melting a resultant mixture to be later or simultaneously molded into the desired shape by extrusion or injection molding, this process can be practiced by two primary shaping methods.

The first shaping method comprises mixing the fixed particles produced as above with a properly selected resin and pigment to form a compound, melting the compound, and then molding the melted compound into the desired shape by extrusion or injection molding.

The second shaping method comprises mixing the fixed particles produced as above with a properly selected resin and a pigment, melting the mixture once for extruding the mixture to form a pellet, and then melting the pellet again, before actually molding it to the desired shape by extrusion or injection molding.

Of course, the above two shaping methods can be employed in a combined manner such that the compound and the pellet are combined with each other in a molten state as desired before the molding.

A molding having a wood-like texture can be manufactured using either of the two shaping methods due to their production of fixed particles comprising surface particles fixed to powdery particles.

Where a wood-like aspect forming pellet in which the fixed particles are mixed with a resin and a pigment is prepared, a different pigment from that mixed in the wood-like aspect forming pellet is added to the wood-like aspect forming pellet, and a resultant mixture is melted to be later or simultaneously molded into the desire shape by extrusion or injection molding, the pigment added to the wood-like aspect forming pellet before the molding may not sufficiently mix in the melted pellet so as to exhibit a stripe pattern during the molding. This makes it possible to form the grain pattern much closer to the natural grain than would be the case of molding by extrusion or injection only the compound or pellet in which the fixed particle are mixed with a resin and a pigment.

Alternatively, it is also feasible that the wood-like aspect forming pellet in which the fixed particles are mixed with a resin and a pigment is prepared in plural kinds, and two or more kinds of these wood-like aspect forming pellets containing different pigments are mixed together and melted to be later or simultaneously molded into the desired shape by extrusion or injection molding. In this case, by molding the mixture under condition that both the wood-like aspect forming pellets are not completely mixed with each other, the pigments in both the wood-like aspect forming pellets are also not completely mixed with each other. Therefore, these pigments not being completely mixed exhibit a stripe pattern during the molding, whereby the grain pattern very close to the natural grain can be formed.

Further, in the above case where the wood-like aspect forming pellet in which the fixed particles are mixed with a resin and a pigment is prepared in plural kinds, and two or more kinds of these wood-like aspect forming pellets containing different pigments are mixed together and melted to be later or simultaneously molded into the desired shape by extrusion or injection molding, the melting temperatures of the wood-like aspect forming pellets to be mixed may be changed for each pellet. By setting the temperature for reelting the pellets that is just enough to melt the wood-like aspect forming pellet having the lower melting temperature, the wood-like aspect forming pellet having the higher melting temperature is not completely melted. Therefore, the pigments in both the wood-like aspect forming pellets are also not completely mixed with each other and, during the molding, these pigments not being completely mixed exhibit a stripe pattern. As a result, the grain pattern very close to the natural grain can be formed.

Similarly, where the wood-like aspect forming pellet in which the fixed particles are mixed with a resin and a pigment is prepared in plural kinds, and two or more kinds of these wood-like aspect forming pellets containing different pigments are mixed together and melted to be later or simultaneously molded into the desired shape by extrusion or injection molding, those wood-like aspect forming pellets mixed together may be selected to have different fluidity when melted. By so selecting, the wood-like aspect forming pellets become hard to completely mix with each other and, during the molding, the pigments in the wood-like aspect forming pellets not being completely mixed exhibit a complicated stripe pattern. As a result, the grain pattern very close to the natural grain can be formed.

Alternatively, it is also feasible that a ground material pellet in which the fixed particles are mixed with a resin and the wood-like aspect forming material pellet in which the fixed particles are mixed with a resin and a pigment are prepared, and the ground material pellet and the wood-like aspect forming material pellet are mixed together and melted to be later or simultaneously molded into the desired shape by extrusion or injection molding. In this case, by molding the mixture in condition that both the pellets are not completely mixed together, the pigment in the wood-like aspect forming material pellet is also not completely mixed and, during the molding, the pigment not being completely mixed exhibits a stripe pattern. As a result, the grain pattern very close to the natural grain can be formed.

In the above case, the melting temperature of the wood-like aspect forming material pellet may be selected to be higher than that of the ground material pellet. By setting the temperature for melting the pellets that is just enough to melt the ground material pellet having the lower melting temperature, the wood-like aspect forming pellet having the higher melting temperature is not completely melted. Therefore, the pigment in the wood-like aspect forming pellet is also not completely mixed and, during the molding, the pigment not being completely mixed exhibits a stripe pattern. As a result, the grain pattern very close to the natural grain can be formed.

Similarly, by selecting the fluidity of the wood-like aspect forming material pellet to be lower than that of the round material pellet when melted, both the pellets become hard to completely mix with each other and, during the molding, the pigment in the wood-like aspect forming pellet not being completely mixed exhibits a stripe pattern. As a result, the grain pattern very close to the natural grain can be formed.

As an alternative, it is further feasible that a resin pellet made of a resin only, the ground material pellet in which the fixed particles are mixed with a resin, and the wood-like aspect forming material pellet in which the fixed particles are mixed with a resin and a pigment are prepared, and the resin pellet, the ground material pellet and the wood-like aspect forming material pellet are mixed together and melted to be later or simultaneously molded into the desired shape by extrusion or injection molding. In this case, too, by molding the mixture in condition that those pellets are not completely mixed together, the pigment in the wood-like aspect forming material pellet is also not completely mixed and, during the molding, the pigment not completely mixed exhibits a stripe pattern. As a result, the grain pattern very close to the natural grain can be formed.

It is further feasible that the ground material pellet in which the fixed particles are mixed with a resin and a pigment pellet in which a resin and a pigment are mixed with each other are prepared, and the ground material pellet and the pigment pellet are mixed together and melted to be later or simultaneously molded into the desired shape by extrusion or injection molding. In this case, too, by molding the mixture in condition that both the pellets are not completely mixed together, the pigment in the pigment pellet is also not completely mixed and, during the molding, the pigment not completely mixed exhibits a stripe pattern. As a result, the grain pattern very close to the natural grain can be formed.

It is further feasible that the wood-like aspect forming material pellet in which the fixed particles are mixed with a resin and a pigment and the pigment pellet in which a resin and a pigment are mixed with each other are prepared, and the wood-like aspect forming material pellet and the pigment pellet are mixed together and melted to be later or simultaneously molded into the desired shape by extrusion or injection molding. In this case, too, by molding the mixture in condition that both the pellets are not completely mixed together, the pigment in the pigment pellet or the pigment in the wood-like aspect forming material is also not completely mixed and, during the molding, the pigment not completely mixed exhibits a complicated stripe pattern. As a result, the grain pattern very close to the natural grain can be formed.

It is further feasible that the wood-like aspect forming material pellet in which the fixed particles are mixed with a resin and a pigment and a wood-like aspect forming material compound in which the fixed particles are mixed with a resin and a pigment are prepared, and the wood-like aspect forming material pellet and the wood-like aspect forming material compound are mixed together and melted to be later or simultaneously molded into the desired shape by extrusion or injection molding. In this case, too, by molding the mixture in condition that the wood-like aspect forming material pellet and the wood-like aspect forming material compound are not completely mixed together, the pigment in the wood-like aspect forming material pellet or the pigment in the wood-like aspect forming material compound is also not completely mixed and, during the molding, the pigment not completely mixed exhibits a complicated stripe pattern. As a result, the grain pattern very close to the natural grain can be formed.

It is further feasible that the wood-like aspect forming material pellet in which the fixed particles are mixed with a resin and a pigment and a ground material compound in which the fixed particles are mixed with a resin are prepared, and the wood-like aspect forming material pellet and the ground material compound are mixed together and melted to be later or simultaneously molded into the desired shape by extrusion or injection molding. In this case, too, by molding the mixture in condition that the wood-like aspect forming material pellet and the ground material compound are not completely mixed together, the pigment in the wood-like aspect forming material pellet is also not completely mixed and, during the molding, the pigment not completely mixed exhibits a Stripe pattern. As a result, the grain pattern very close to the natural grain can be formed.

It is further feasible that the wood-like aspect forming material pellet in which the fixed particles are mixed with a resin and a pigment and a pigment compound in which resin and a pigment are mixed with each other are prepared, and the wood-like aspect forming pellet and the pigment compound are mixed together and melted to be later or simultaneously molded into the desire shaped by extrusion or injection molding. In this case, too, by molding the mixture in condition that the wood-like aspect forming material pellet and the pigment compound are not completely mixed together, the pigment in the wood-like aspect forming material pellet or the pigment in the pigment compound is also not completely mixed and, during the molding, the pigment not completely mixed exhibits a complicated stripe pattern. As a result, the grain pattern very close to the natural grain can be formed.

It is further feasible that the ground material pellet in which the fixed particles are mixed with a resin and a wood-like aspect forming material compound in which the fixed particles are mixed with a resin and a pigment are prepared, and the ground material pellet and the wood-like aspect forming material compound are mixed together and melted to be later or simultaneously molded into the desired shape by extrusion or injection molding. In this case, too, by molding the mixture in condition that the ground material pellet and the wood-like aspect forming material compound are not completely mixed together, the pigment in the wood-like aspect forming material compound is also not completely mixed and, during the molding, the pigment not completely mixed exhibits a stripe pattern. As a result, the grain pattern very close to the natural grain can be formed.

It is further feasible that the ground material pellet in which the fixed particles are mixed with a resin and a pigment compound in which a resin and a pigment are mixed with each other are prepared, and the ground material pellet and the pigment compound are mixed together and melted to be later or simultaneously molded into the desired shape by extrusion or injection molding. In this case, too, by molding the mixture in condition that the ground material pellet and the pigment compound are not completely mixed together, the pigment in the pigment compound is also not completely mixed and, during the molding, the pigment not completely mixed exhibits a stripe pattern. As a result, the grain pattern very close to the natural grain can be formed.

It is further feasible that the pigment pellet in which a resin and a pigment are mixed with each other and the wood-like aspect forming material compound in which the fixed particles are mixed with a resin and a pigment are prepared, and the pigment pellet and the wood-like aspect forming material compound are mixed together and melted to be later or simultaneously molded into the desired shape by extrusion or injection molding. In this case, too, by molding the mixture in condition that the pigment pellet and the wood-like aspect forming material compound are not completely mixed together, the pigment in the pigment pellet or the pigment in the wood-like aspect forming material compound is also not completely mixed and, during the molding, the pigment not completely mixed exhibits a complicated stripe pattern. As a result, the grain pattern very close to the natural grain can be formed.

In order to that the pigment not completely mixed exhibits a stripe pattern during the molding to form the grain pattern very close to the natural grain as mentioned above, the molding conditions are set beforehand such that the pigment in the pellet or the compound flows at random through the melted material rather than regularly or uniformly, thereby forming a strip-like colored portion. This strip-like colored portion provides the grain pattern very close to the natural grain.

Furthermore, in the case of fixing a white inorganic pigment to the surface of the pulverized dust in the pellet or the compound, when the pulverized dust appears on the side nearest to the surface than a colored pigment in the resultant molding, the color of the underlying colored pigment is so concealed that the colored portion formed by the colored pigment on the molding surface becomes extremely uneven in color and thickness, rendering the resultant pattern closer to the natural grain.

Additionally, the simulated wood product molded as above shows not only a texture similar to wood, but also a colored portion formed by a colored pigment on the molding surface depending on the condition during the molding. Thus, in an outer appearance of the product, the colored portion seems like the natural grain.

BEST MODE FOR CARRYING OUT THE INVENTION

Figure 1:
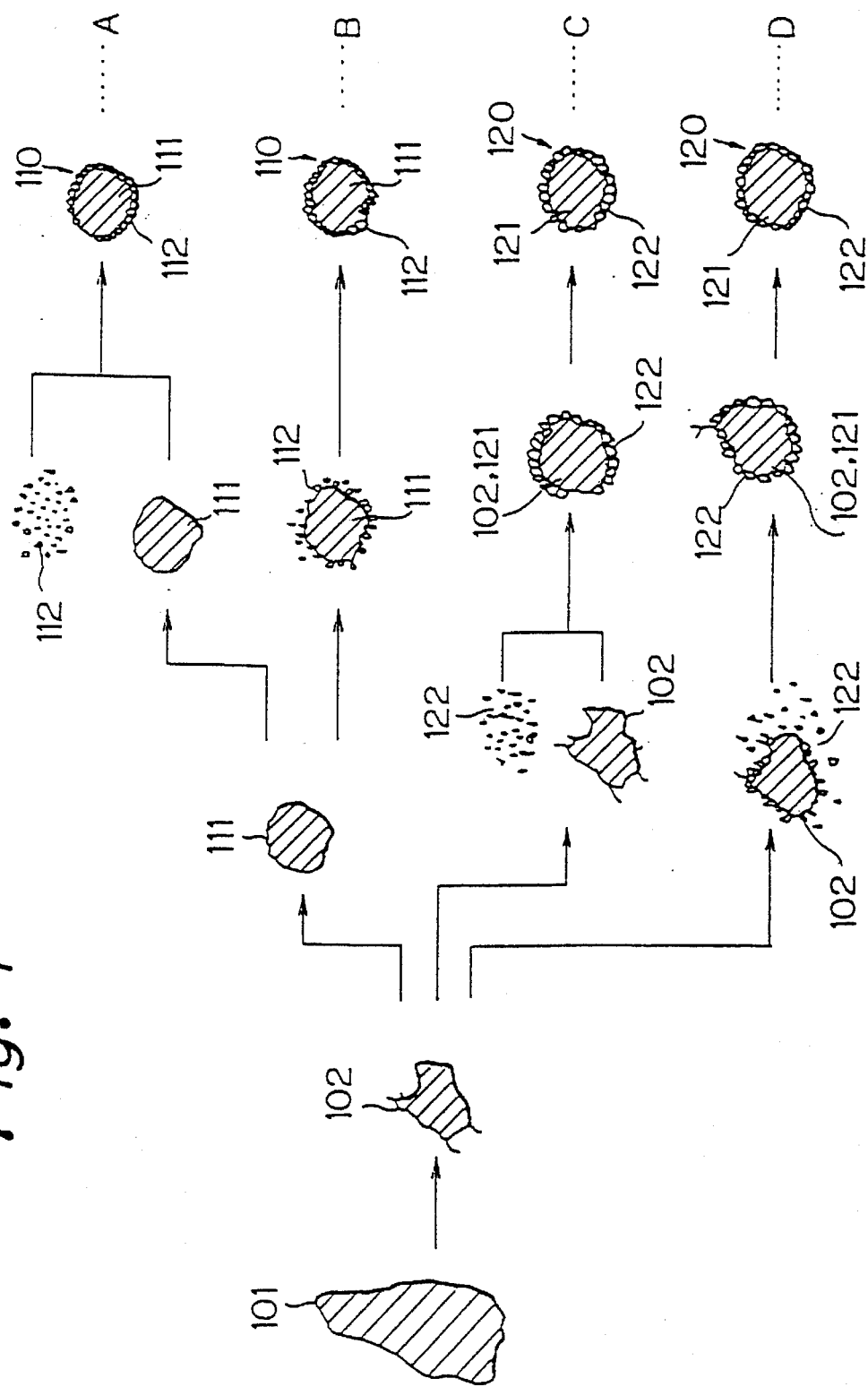
FIG. 1 is a general explanatory view schematically illustrating steps of forming pulverized dust from raw material wood and fixing surface particles to the pulverized dust surface, and steps of forming powdery particles from the pulverized dust and fixing surface particles to the surfaces of the powdery particles.

Hereinafter, a wooden-like product manufacturing method of the present invention will be described first on a general process and then on individual steps in detail.

The wooden-like product manufacturing method of the present invention comprises the steps of:

1 pulverizing a cellulose material as raw materials into pulverized dust;

2 further pulverizing the pulverized dust with trituration process into powdery particles having a higher bulk specific gravity;

3 fixing surface particles, which are smaller in size and harder than the powdery particles, to an outer circumferential surface of each of powdery particles to produce fixed particles; and 4 shaping a mixture of the fixed particles with a resin and a pigment into the desired shape by extrusion or injection molding.

The above steps 2 and 3 can be performed at the same time.

The shaping method of carrying out the step 4 is primarily divided into two types below.

The first shaping method comprises mixing the fixed particles produced as above with a resin and a pigment to form a compound, melting the compound, and then molding the melted compound into the desired shape by extrusion or injection molding.

The second shaping method comprises mixing the fixed particles produced as above with a resin and a pigment, melting the mixture once for extruding the mixture to form a pellet, and then melting the pellet again, before actually molding it to the desired shape by extrusion or injection molding.

Of course, the above two shaping methods can be employed in a combined manner such that the compound and the pellet are combined with each other in a molten state as desired before the molding.

A molding having a wood-like texture can be manufactured using either of the two shaping methods due to their production of fixed particles comprising surface particles fixed to powdery particles.

To put it in more detail, the shaping method can be practiced in the following various measures:

4-1 A wood-like aspect forming material compound in which the fixed particles are mixed with a resin and a pigment is directly employed as a molding material.

4-2 A wood-like aspect forming material pellet in which the fixed particles are mixed with a resin and a pigment is prepared and only this pellet is employed for the molding.

4-3 A wood-like aspect forming material pellet in which the fixed particles are mixed with a resin and a pigment is prepared and a different pigment from that used in the pellet is added to the pellet before the molding.

4-4 A wood-like aspect forming material pellet in which the fixed particles are mixed with a resin and a pigment is prepared in plural kinds containing different pigments, and two or more kinds of these pellets containing different pigments are mixed with each other and employed for the molding.

4-5 A ground material pellet in which the fixed particles are mixed with a resin and a wood-like aspect forming material pellet in which the fixed particles are mixed with a resin and a pigment are mixed together and employed for the molding.

4-6 A resin pellet made of a resin only, a ground material pellet in which the fixed particles are mixed with a resin, and a wood-like aspect forming material pellet in which the fixed particles are mixed with a resin and a pigment are mixed together and employed for the molding.

4-7 A ground material pellet in which the fixed particles are mixed with a resin and a pigment pellet in which a resin and a pigment are mixed with each other are mixed together and employed for the molding.

4-8 A wood-like aspect forming material pellet in which the fixed particles are mixed with a resin and a pigment and a pigment pellet in which a resin and a pigment are mixed with each other are mixed together and employed for the molding. 4-9 A wood-like aspect forming material pellet in which the fixed particles are mixed with a resin and a pigment and a wood-like aspect forming material compound in which the fixed particles are mixed with a resin and a pigment are mixed together and employed for the molding.

4-10 A wood-like aspect forming material pellet in which the fixed particles are mixed with a resin and a pigment and a ground material compound in which the fixed particles are mixed with a resin are mixed together and employed for the molding.

4-11 A wood-like aspect forming material pellet in which the fixed particles are mixed with a resin and a pigment and a pigment compound in which a resin and a pigment are mixed with each other are mixed together and employed for the molding.

4-12 A ground material pellet in which the fixed particles are mixed with a resin and a wood-like aspect forming material compound in which the fixed particles are mixed with a resin and a pigment are mixed together and employed for the molding.

4-13 A ground material pellet in which the fixed particles are mixed with a resin and a pigment compound in which a resin and a pigment are mixed with each other are mixed together and employed for the molding.

4-14 A pigment pellet in which a resin and a pigment are mixed with each other and a wood-like aspect forming material compound in which the fixed particles are mixed with a resin and a pigment are mixed together and employed for the molding.

Therefore, the following description will be made of the steps until forming the fixed particles and the subsequent shaping step separately.

First, embodiments of the fixed particles and methods of manufacturing the fixed particles will be described in detail.

Prior to describing details of embodiments of the present invention, primary terms used in the following description are basically defined as follows. It should be understood that the concept of the invention is not entirely restricted by only the definitions below, taking into account the fact that wood dust to be handled is in the form of very fine micro particles having an extremely small size and, therefore, it is inevitable to describe the action or behavior of such fine particles based on inference to some extent.

The term "trituration process between pulverizing balls" means pulverization of objective substances which is performed mainly by a ball mill under attrition action. This process will also be referred to as trituration.

The term "ball mill" used in this Description implies a mill in which pulverizing balls are stirred in the vertical and circumferential directions mainly by stirring means, and objective substances are pulverized under attrition action produced between the pulverizing balls. This term includes not only a ball mill of container rotating type, but also any other types of ball mills.

The term "powdery particle" means all of the wood dust in a such slate as that the pulverized dust is further pulverized with the trituration process between the pulverizing balls to have a higher bulk specific gravity. Thus, the wood dust in which whisker-like fibers or the like projecting from the pulverized dust are eliminated by being removed or pressed against the dust surface through further pulverization of the pulverized dust under attrition between the pulverizing balls, with a resultant higher bulk specific gravity, is here called powder particles.

Accordingly, the substances called "powder particles" here are particles whose outer shapes are mainly indefinite, including spherical or sphere-like shapes, and not limited to spherical or sphere-like particles.

In other words, the "powdery particles" defined as the wood dust having an increased bulk specific gravity means herein every form of wood dust comprising pulverized dust whose bulk specific gravity is substantially increased as a result of the trituration process between the pulverizing balls, and hence its concept includes;

not only wood dust of the type that only the pulverized dust is further pulverized with the trituration process between the pulverizing balls, apart from fixing of the surface particle, to have a higher bulk specific gravity, but also, e.g., wood dust of the type that while fixing the surface particles to the surfaces of the pulverized dust as such or the pulverized dust under the condition of increasing a bulk specific gravity, the pulverized dust is subjected to the trituration process between the pulverizing balls to have a higher bulk specific gravity, and wood dust of the type that the surfaces of the pulverized dust as such or the pulverized dust under the condition of increasing a bulk specific gravity are subjected to the trituration process between the pulverizing balls to have a higher bulk specific gravity.

The "bulk specific gravity" is increased, more specifically, by further pulverizing the pulverized dust with the trituration process between the pulverizing balls so that the outer shape of the pulverized dust is essentially trimmed.

Thus, the bulk specific gravity is essentially increased as a result of the facts, for example, that whisker-like fibers or the like projecting from the pulverized dust are eliminated by being removed or pressed against the dust surface through further pulverization of the pulverized dust under attrition between the pulverizing balls, providing a more granular shape, that angled corners are removed or pressed with the trituration process between the pulverizing balls, providing a rounder shape, that projecting portions are removed or pressed with the trituration process between the pulverizing balls, providing a rounder shape, and that whiskers in the form of cilia, etc. are removed or pressed with the trituration process between the pulverizing balls, and portions where the whiskers in the form of cilia are tangled with each other to produce a relatively sparse state is pressed with the trituration process between the pulverizing balls, establishing a relatively dense state.

The term "external pressing force" means a pressing force applied externally of the dust surface mainly by mechanical means; for example, a pressing force generated independently with the trituration alone, i.e., pressure and attrition, or in combination with pulverizing action, which are effected by suitable mechanical means.

The term "fixing" means that the surface particles are fixed, without resorting to such measures as chemical reaction or adhesion, to the surface of the powdery particle such an extent that the surface particles are not easily detached therefrom by a pressing force applied externally of the surface.

The particle size of the pulverized dust and the powdery particles (Tables 2, 3, 4, 5, 6 and 7) represents, by way of example;

a value resulted from dispersing each of these dust and particles in a specified solution into a suspended condition, introducing the solution to pass a transparent flow path, irradiating a laser beam to transmit through the flow path to measure the length, and then converting the measured value into a diameter of the particle.

The particle size of raw material wood (Table 1) is determined by sieving the raw material wood for 5 minutes using a vibratory sieving machine (Ro-TAP shaker) for test, and representing the particle size of the raw material wood, which has passed a sieve having coarser mesh, but remains on a sieve having finer mesh, as the mesh size of the latter sieve.

The term "average particle size" means a mesh size of the sieve through which 50 wt. % (a half amount) of the pulverized dust and the powdery particle in terms of accumulated weight percentage distribution has passed.

The term "hardness" means a hardness in a state of raw materials before the pulverization, e.g., the Shore hardness in the following embodiments, because the pulverized dust, the powdery particles and the surface particles are relatively very fine and have difficulties in directly measuring a hardness thereof, as previously described.

A first fixed particle and a second fixed particle which are processed to have the basic structure according to one embodiment of the present invention will be described below in detail with reference to FIG. 1.

The first fixed particles in this embodiment are prepared by further pulverizing a great deal of pulverized dust with the trituration process between the pulverizing balls to trim the outer shapes thereof and form powdery particles having an increased bulk specific gravity, and then fixing a plurality of surface particles, which are smaller and harder than the powdery particles, to the surface of each powdery particle.

Also, the second fixed particles in this embodiment are prepared by further pulverizing a great deal of pulverized dust obtained by pulverizing raw material wood and of surface particles, which are smaller and harder than the pulverized dust, with the trituration process between the pulverizing balls, and simultaneously fixing the plurality of surface particles to the surface of each of the pulverized dust, or by fixing the plurality of surface particles to the surface of each of the pulverized dust, and then increasing a bulk specific gravity of the pulverized dust itself with the continued trituration process between the pulverizing balls for conversion into powdery particle.

First fixed particle

A description will first be made of typical first and second methods for obtaining first fixed particles 110.

The typical first method for obtaining the first fixed particles 110 is indicated by A in FIG. 1.

For obtaining the first fixed particles 110 by the first method, raw material wood 101 is first sufficiently pulverized by using a pulverizer under such actions as impact, shearing and trituration, thereby producing pulverized dust 102 having a particle size within the predetermined range.

Then, the pulverized dust 102 is further sufficiently pulverized with the trituration process between the pulverizing balls, thereby producing powdery particles 111 whose outer shapes are trimmed and whose bulk specific gravity is increased.

The powdery particles 111 thus obtained and surface particles 112 prepared separately are supplied to pressure applying means for generating external pressing forces, e.g., a dry ball mill, whereby the surface particles 112 are fixed to the surfaces of the powdery particles 111 under the external pressing forces to produce the first fixed particles 110.

The typical second method for obtaining the first fixed particles 110 is indicated by B in FIG. 1.

For obtaining the first fixed particles 110 by the second method, surface particles 112 are sprinkled or attached by preliminary mixing to the powdery particles 111 obtained in the first method. Then, the powdery particles 111 having the surface particles 112 on the surfaces thereof are supplied to pressure applying means for generating external pressing forces, e.g., a dry ball mill, whereby the surface particles 112 on the surfaces of the powdery particles 111 are fixed thereto to produce the first fixed particles 110.

In the above process, the powdery particles 111 which are obtained by mechanically triturating the pulverized dust 102 and have the increased bulk specific gravity exhibit a more granular shape as a result of that the pulverized dust 102 is further pulverized with the trituration and whisker-like portions projecting from the pulverized dust 102 are cut out or pressed against the dust surface, and as a result of the powdery particles 111 having the increased bulk specific gravity, the plurality of surface particle 112 can be easily and surely fixed to the surface of each powdery particle while holding various characteristics and functions specific to the raw material wood 101 itself, e.g., ability of absorbing and releasing water and texture feeling.

Since the first fixed particles 110 are obtained by fixing the surface particles 112 to the powdery particles 111, having the increased bulk specific gravity, under the external pressing forces, the surface particles 112 on the first fixed particle 110 are easily and uniformly fixed to the surfaces of the powdery particles 111.

Since the first fixed particles 110 are obtained by fixing the surface particles 112 to the surfaces of the powdery particles 111, having the increased bulk specific gravity, through biting or other coupling forms, the surface particles 112 on the first fixed particle 110 are positively and substantially uniformly fixed to the surfaces of the powdery particles 111 having the increased bulk specific gravity.

Since the bulk specific gravity of the powdery particles 111 constituting the fixed particles 110 is sufficiently increased and the surface particles 112 are fixed to the surfaces of the powdery particles 111 having the increased bulk specific gravity, the first fixed particles 110 thus obtained have good fluidity and do not agglomerate with each other when handled. Also, the first fixed particles 110 have good dispersity when molded or mixed in objective substances for mixing such as a paint.

Since the surface particles 112 are simply fixed to the powdery particles 111 under the external pressing forces only, the surface particles 112 are less likely to detach from the powdery particles 111 even when the resultant first fixed particles 110 are used in a solution or solvent or at high temperatures.

Since the surface particles 112 of the first fixed particles 110 thus obtained can exhibit various functions and characteristics their own in condition that they are fixed to the surfaces of the powdery particles 111, the surface particles 112 are more easily handled than those which would not be fixed to the powdery particles 111.

Further, the surface particles 112 of the first fixed particles 110 thus obtained cover or substantially cover the surfaces of the powdery particles 111, as carrier bases, to form surface barriers, making it possible to prevent release of unnecessary components such as wood vinegar and lignin from the powdery particles 111 on the inner side. The surface particles 112 also function to resist a thermal load exerted from the outside, prevent intrusion of undesired pharmaceuticals or the like, and to sufficiently protect the powdery particles 111, so that their specific properties are effectively given to the first fixed particles 110.

Since the surfaces of the powdery particles 111 are each covered with the plurality of surface particles 112 in the first fixed particles 110 thus obtained, the lower hardness and smaller bulk specific gravity as being intrinsic to the powdery particles 111 are eventually compensated by the hardness and bulk specific gravity of the surface particles 112 covering the surfaces, thereby ensuring protection and providing the sufficient hardness.

Also, since the powdery particles 111 are relatively light, the weight of the first fixed particles 110 can be reduced as a whole. Additionally, wood chips, sawdust, etc. which had been only utilized as heat sources in the past can be effectively and advantageously utilized, which contributes to a saving of natural resources.

A particle size distribution of the powdery particles 111 of the first fixed particles 110 may be related below to that of titanium oxide powder as the surface particles 112 fixed to the surfaces of the powdery particles 111, assuming that agglomerated particles of titanium oxide powder are also separated from one another when fixed:

for the powdery particles 111 having a particle size distribution of

| 1 to 10 μm, | not greater than 3 μm |
| 11 to 30 μm, | 0.1 to 10 μm |
| not less than 101 μm, | not less than 1 μm |

The hardness for each of the raw material wood 101 generally used for the powdery particles 111 and the surface particles 112 harder than the raw material wood 101, such as titanium oxide, carbon, nickel and calcium carbonate, is cited below based on the so-called Shore hardness which is determined by dropping a rebound hammer from a predetermined height and measuring a height of the hammer repelled after the bump:

| raw material wood | 35 to 50 |
| titanium oxide | 150 to 180 |
| carbon | 60 to 65 |
| nickel | 90 to 100 |
| calcium carbonate | 120 to 140 |

Second fixed particle

A typical first method for obtaining the second fixed particle is indicated by C in FIG. 1.

For obtaining second fixed particles 120 by the first method, raw material wood 101 is first sufficiently fractured and pulverized by using a pulverizer under such actions as impact, shearing and attrition, thereby producing pulverized dust 102 having a particle size within the predetermined range.

Then, the pulverized dust 102 and surface particles 112 are supplied to a trituration processing section between the pulverizing balls for increasing the bulk specific gravity of the pulverized dust as such with the trituration process between the pulverizing balls. Simultaneously, the same surface particles 122 as used above are fixed, with the trituration process between the pulverizing balls, to the surface of the pulverized dust 102, the surface of the pulverized dust 102 being converted into powdery particles 121, and the surfaces of the powdery particles 121 being increased in bulk specific gravity with the trituration process between the pulverizing balls.

The trituration process between the pulverizing balls in the above is continued until the pulverized dust 102 to be pulverized becomes the powdery particles 121 having a sufficiently increased bulk specific gravity with the trituration process between the pulverizing balls.

The second fixed particles 120 are thus obtained.

Next, a second method for obtaining the second fixed particles 120 is indicated by D in FIG. 1.

For obtaining the second fixed particles 120 by the second method, the surface particles 122 are sprinkled or attached by preliminary mixing to the pulverized dust 102 obtained by the same measures as in the above first method. Then, the pulverized dust 102 having the surface particles 122 attached thereto is subjected to the trituration process between the pulverizing balls.

The trituration process between the pulverizing balls acting upon the pulverized dust 102 is continued until the pulverized dust 102 becomes the powdery particles 121 having a sufficiently increased bulk specific gravity with the trituration process between the pulverizing balls, and also until the surface particles 122 are fixed, with the trituration process between the pulverizing balls, to the surfaces of the powdery particles 121 formed with the trituration process between the pulverizing balls.

The second fixed particles 120 are thus obtained.

The surface configuration of the pulverized dust 102 is essentially trimmed as a result of that the outer surface and hence the surface configuration thereof are progressively changed with the trituration process between the pulverizing balls.

The change in the surface configuration is found not only in the case of simultaneously supplying the pulverized dust 102 and the surface particles 122 to a triturator for further pulverization with the trituration process between the pulverizing balls, and but also in the case of sprinkling the surface particles 122 over the pulverized dust 102 and then supplying them together to a triturator for further pulverization with the trituration process between the pulverizing balls.

In other words, the surface configuration of the pulverized dust 102 is essentially trimmed through trituration before the fixing of the surface particles 122 and through trituration applied to the surfaces of the surface particles 122 after the fixing of the surface particles 122.

More specifically, the pulverized dust 102 exhibits more granular shape as a result of that whisker-like portions projecting from the pulverized dust 102 are cut out or pressed against the dust surface with the trituration process between the pulverizing balls.

Also, the fiber-like whiskers on the pulverized dust 102 are pressed by the surface particles 122 so as to cover the circumferential surface of the pulverized dust 102, or portions of the whiskers projecting outwardly of the surface particles 122 are cut out.

Further, the surface configuration of the pulverized dust 102 is trimmed due to that the dust surface is subjected to pressure and rolling actions.

Since the second fixed particles 120 are obtained in a condition wherein the pulverized dust 102 is further pulverized with the trituration process between the pulverizing balls to become the powdery particles 121 having the increased bulk specific gravity and the surface particles 122 are fixed to the surfaces of the powdery particles 121 having the increased bulk specific gravity, the surface particles 122 are positively and uniformly fixed to the powdery particles 121.

Since the resultant fixed particles 120 have good fluidity, they do not agglomerate with each other when handled, and are well distributed in objective substances for mixing when mixed therein.

Since the surface particles 122 of the second fixed particles 120 are fixed to the surfaces of the powdery particles 121 in such a condition as not to easily peel off and this fixing is established under the external pressing forces, the surface particles 122 do not detach from the powdery particles 121 and are stably held on the powdery particles 121 even when the fixed particles 120 are used in a solution or solvent or at high temperatures.

Since the surface particles 122 of the second fixed particles 120 can exhibit various functions and characteristics their own in condition that they are fixed to the surfaces of the powdery particles 121, the surface particles 122 can be used in such a condition as not to agglomerate with each other.

Furthermore, since the second fixed particles 120 are obtained by fracturing and pulverizing the raw material wood 101 using mechanical means, they hold various characteristics and functions specific to the raw material wood 101 itself, e.g., ability of absorbing and releasing water and texture feeling. Additionally, since the surface particles 122 cover or substantially cover the surfaces of the powdery particles 121 to form surface barriers, they serve to effectively give the fixed particles 120 the various characteristics and functions of the raw material wood 101.

Method of manufacturing first and second fixed particles

Details of means for manufacturing the first fixed particles 110 and the second fixed particles 120 will now be described in detail.

Herein, because the first fixed particles 110 and the second fixed particles 120 are common to each other in that the pulverized dust 102 under the process of forming the second fixed particles 120 corresponds substantially to the pulverized dust 102 as a material used for the first fixed particles 110, and that the second fixed particles 120 are almost similar the first fixed particles 110 in means and forms for fixing the plurality of surface particles 112 to the surface of each particle, the following description will be made of mainly the first fixed particles 110 and of the second fixed particles 120 as required.

Natural wood employed in this embodiment as raw materials to be crushed and pulverized may be any of a needle-leaf tree, a broadleaf tree, etc. such as a Japanese hemlock (or hemlock spruce) and lauan which are universally utilized. Any such a kind of sawn wood, chips or sawdust thereof, etc. is used as raw materials. In addition, bagasse, straws of rice plants, etc. may also of course employed.

For preparing the raw material wood 101, sawn wood, chips and the like of those raw materials are once cut and crushed by using known mechanical means, e.g., a cutter mill, without charring them and marring various functions specific to woody materials, thereby producing a great deal of stock selected to have the particle size finer than 1000 μm, preferably not greater than 500 μm.

The raw material wood 101 thus prepared is subjected to the predetermined pretreatment, if necessary. The pretreatment is carried out by respective known means for usually bleaching or removing unnecessary substances in the stock such as lignin, tannin, and other undesired pigments and resin.

After that, the raw material wood 101 is pulverized by using a fine crusher for pulverizing materials under such actions as impact, shearing and trituration, e.g., an impellet mill, as a pulverizing machine without marring various characteristics and functions specific to woody materials as with the above case, thereby obtaining the pulverized dust selected to have the particle size preferably not greater than about 200 μm.

In this connection, as previously described, the pulverized dust 102 obtained by pulverizing the raw material wood 101 under such actions as impact, shearing and trituration hold various characteristics and functions specific and intrinsic to wood itself, but yet include dust in the form of long fibers and still have fiber-like whiskers in the form of slender cilia on the circumferential surface.

Also, the pulverized dust 102 obtained has many angled or projecting portions, is bulky as a whole, and is liable to agglomerate together.

As the pulverizer for pulverizing the raw material wood 101, an impeller mill, for example, provided with a rotor having impact blades, which are radially projected from a circumferential surface of the rotor and have an adjustable clearance with respect to a corrugated liner on an inner surface of a pulverizing chamber, may be employed.

By rotating the rotor at a high speed while adjusting the clearance of the impeller mill, the raw material wood 101 is pulverized not only through impact fracture effected between the corrugated liner and the impact blades, but also through impact fracture effected by being smashed against the corrugated liner surface with the impact blades themselves.

The pulverized dust 102 thus obtained may be used without classification, but it is preferable that the pulverized dust 102 is classified at the same time as or after the pulverization in an appropriate manner to provide groups of the pulverized dust 102 having their particle sizes in accordance with purposes of use. The pulverized wood dust 102 prepared as above is dried prior to the pulverization process between the pulverizing bails under attrition action, i.e., the trituration process, or during the trituration process so as to have an adjusted water content less than 10 wt %, preferably less than 8 wt %, more preferably not greater than 3 wt %.

Drying the pulverized dust 102 is significant in effectively providing the pulverized dust 102 with surface denaturing action due to the trituration process, preventing the foaming bubbles due to moisture during the shaping operation, and avoiding an adverse influence upon an objective substance, e.g., a paint, when the dust is mixed and dispersed in the objective substance.

Subsequently, the pulverized dust 102 processed as above is subjected to another pulverization between the pulverizing balls under attrition action, i.e., the trituration process by mechanical means. The trituration process upon the pulverized dust 102 is performed prior to the fixing of the surface particles 112 for first wood dust. For second wood dust, the trituration process is performed at the same time as the fixing of the surface particles 122, or in condition that the surface particles 122 are temporarily or positively fixed.

Figure 2:
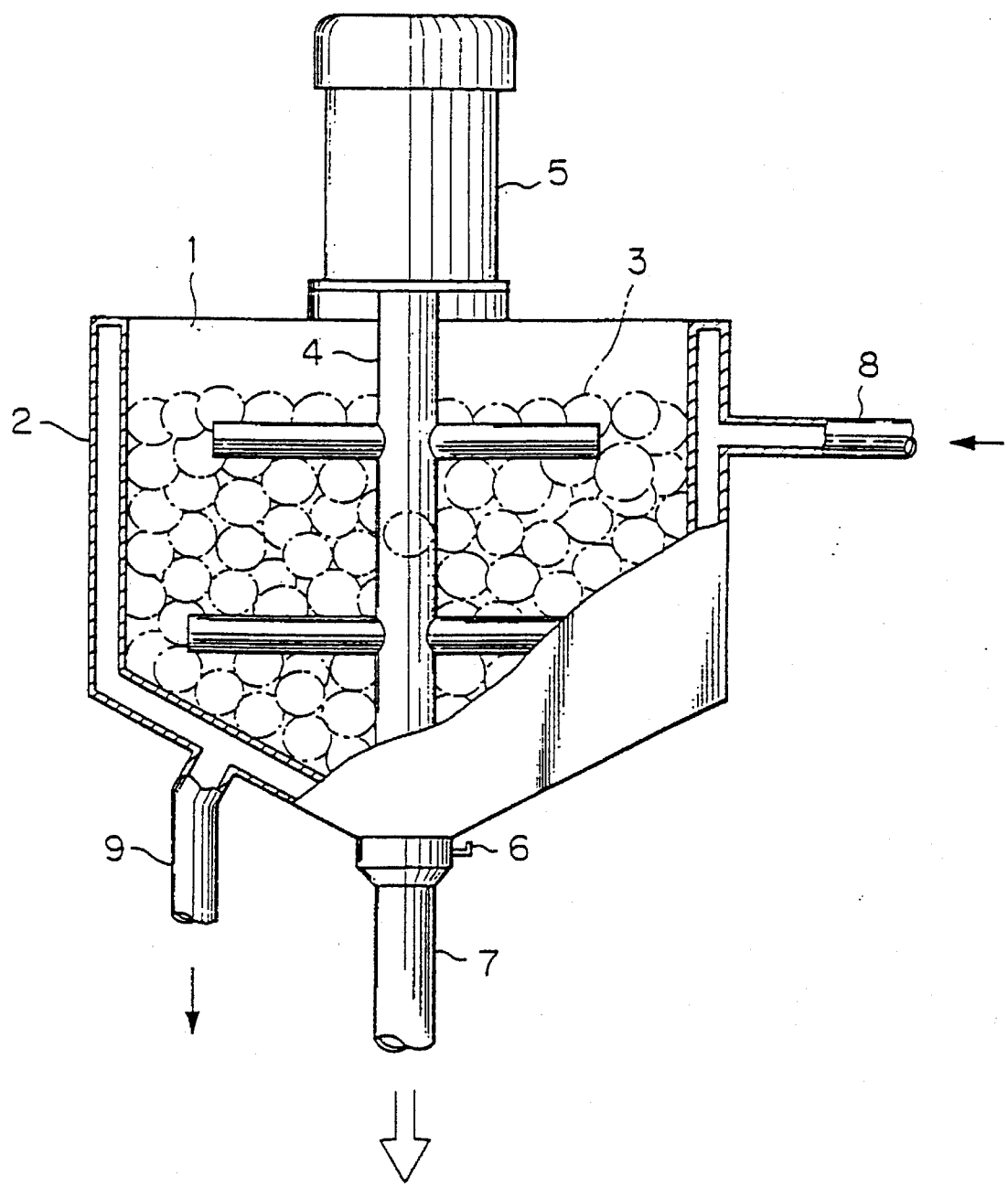
FIG. 2 is a front vertical sectional view showing, by way of example, the schematic structure of a primary part of an open-type dry ball mill for use in the pulverization process of the pulverized dust and the powdery particles under attrition action.
Figure 3:
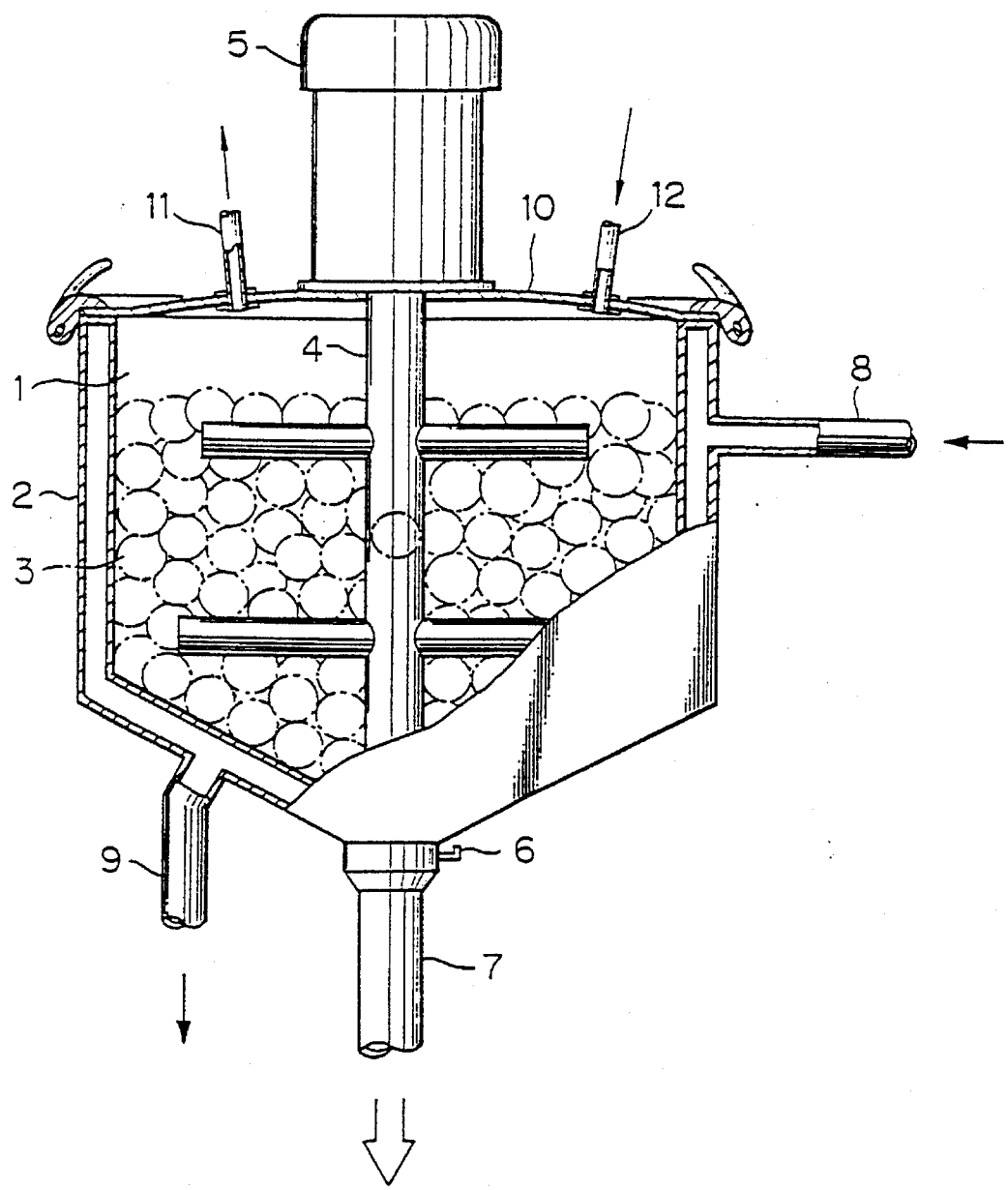
FIG. 3 is a front vertical sectional view showing, by way of example, the schematic structure of a primary part of a closed-type dry ball mill for use in the pulverization process of the pulverized dust and the powdery particles under attrition action.

One typical means for the mechanical trituration process is a dry ball mill shown in FIG. 2. The trituration process by the dry ball mill for producing the powdery particles 111 used to produce the first fixed particles 110 will be described below.

In the trituration process of the pulverized dust 102 by the dry ball mill, there is a fear that the temperature in the mill may be so abruptly raised as to case a dust explosion, or that the pulverized dust 102 or the powdery particles 111 having the increased bulk specific gravity may lose various intrinsic characteristics and functions through the trituration at high temperatures. As shown in FIG. 2, therefore, a water jacket 2 is formed in a peripheral wall of a mill body 1 and cooling water is always supplied from a water feed pipe 8 to a drain pipe 9 so that the temperature in the mill is kept at least not greater than 80° C., preferably not greater than 70° C.

Inside the mill, there are disposed stirring bars 4 as stirring means rotated by a motor 5, and a number of pulverizing balls 3 stirred and rolled by the stirring bars 4 to generate trituration action. The pulverized dust 102 is charged into the mill through the open top before starting operation of the mill. The mill is of the so-called batch type that, at completion of one-cycle process, the resultant powdery particles are taken out to the outside from a discharge valve 6 through a discharge port 7.

Furthermore, as the pulverizing balls 3 to generate the trituration process are used ceramic balls having a diameter of 3 mm to 15 mm. Stainless balls are not used in consideration of the possibility of dust explosion or the generation of metal dust.

In the dry ball mill constructed as above, the pulverized dust 102 charged into the mill is triturated between the stirred and rolled pulverizing balls 3 such that the pulverized dust 102 in the form of a long fiber is further pulverized through fracture and attrition to have a more granular shape. Thus, angled or projecting portions and whisker-like portions in the form of cilia of the pulverized dust 102 are removed or deformed, whereby the pulverized dust 102 is trimmed so as to have an entire shape closer to a granule. Simultaneously, the pulverized dust 102 is quickly heated up to the required temperature due to friction heat generated between the pulverizing balls 3 and between the pulverizing balls and the pulverized dust 102. As a result, the moisture contained in the pulverized dust is gradually removed and the dust is dried to have a moisture content not greater than about 4 wt % through the continued trituration.

It is found that the pulverized dust 102 having been processed tends to become smaller to some extent with the drying. Thus, the drying promotes the size reduction of the pulverized dust and the subsequent fixing, i.e., biting action, of the surface particles 112 to the dust surface.

Instead of the open-type dry ball mill constructed as above, a closed-type dry ball mill including a seal-up lid 10 provided with an air outlet pipe 11 and an air intake pipe 12 may be employed.

In the trituration process of the pulverized wood dust 102 using the closed-type dry ball mill, it is desirable to set the oxygen content in the mill to be within 15% and the mill temperature to be not higher than 80° C. The closed-type mill is operated under an inert atmosphere by closing a pulverizing chamber in the mill by the seal-up lid 10 and then replacing the air in the pulverizing chamber with inert gas, e.g., nitrogen gas, or continuously flowing the nitrogen gas through the air outlet pipe 11 and the air intake pipe 12.

Figure 4:
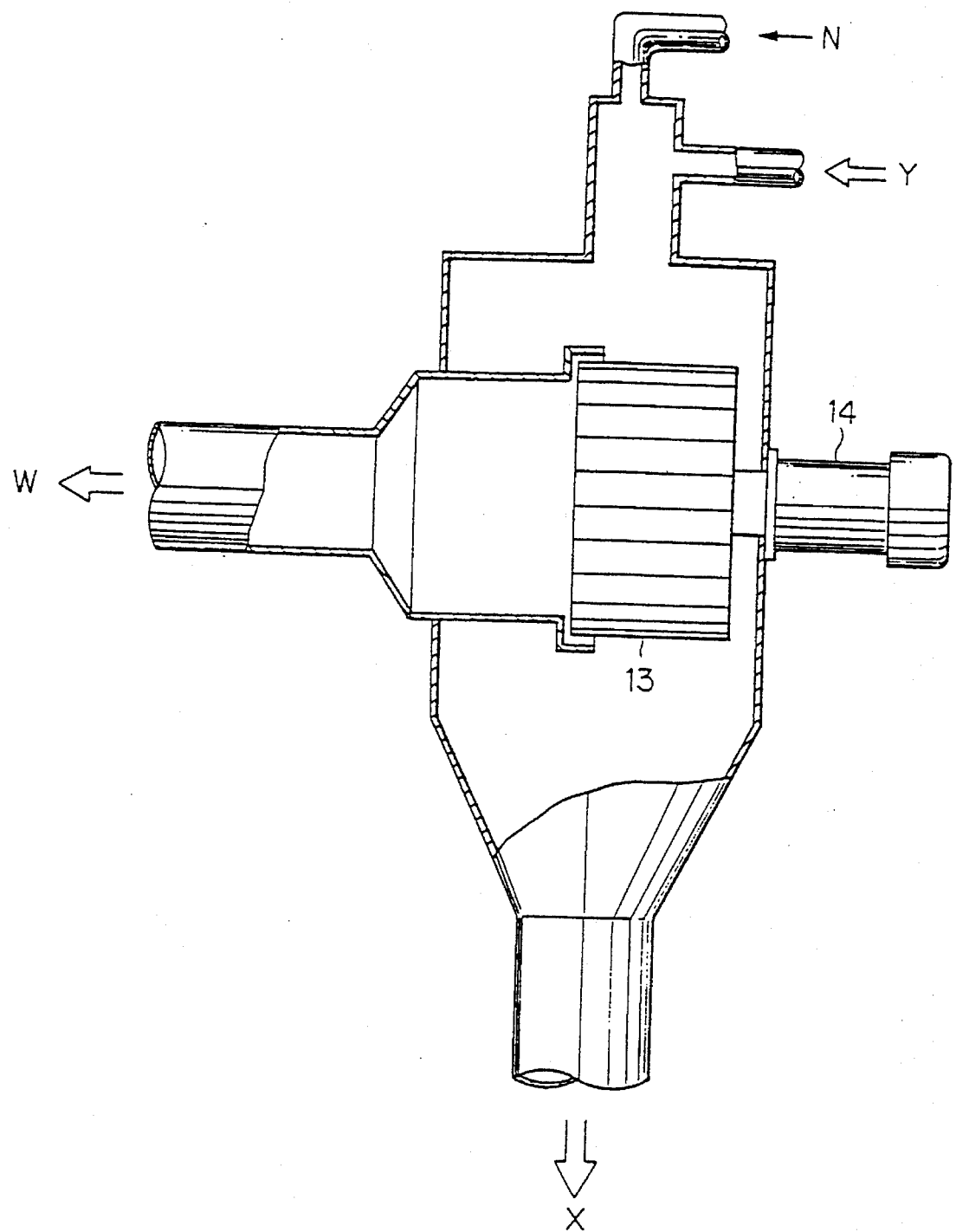
FIG. 4 is a front vertical sectional view showing, by way of example, the schematic structure of a classifier for use in classifying the pulverized dust and the wood powdery particles.

A classifier as shown in FIG. 4, for example, may be employed for classifying the wood dust 111 which has been triturated with the pulverization process between the pulverizing balls under attrition action to become rounder as whole by trimming of the outer configuration and have the increased bulk specific gravity.

The illustrated classifier is a bulk specific gravity classifier of wind force type for classifying particles depending on their true specific gravity. The pulverized dust 102 is supplied to the classifier in the direction indicated by the arrow Y is classified under balance between centrifugal forces generated with rotation of a classifying rotor 13 driven by a motor 14 and suction forces due to a vacuum acting in the direction indicated by the arrow W. Those coarse particles which do not satisfy the classifying conditions are taken out in the direction indicated by the arrow X. To avoid a danger of possible dust explosion of very fine wood dust in the classifier, the classifier is also operated under an inert atmosphere by continuously supplying nitrogen gas into the classifier in the direction indicated by the arrow N and keeping the oxygen content therein within 15%.

The powdery particles 111 thus obtained have an average particle size a little smaller than that of the pulverized dust 102 before the pulverization process between the pulverizing balls under attrition, i.e., the trituration process, and have a bulk specific gravity higher than that of the pulverized dust 102 before the trituration process. Further, the pulverized dust 102 in the form of a long fiber, the pulverized dust 102 having angled or projecting portions and whisker-like portions in the form of cilia, and the pulverized dust 102 having some of those portions are turned, after the trituration process, to the powdery particles 111 which exhibit a relatively round, smooth and compact outer surface.

A description will now be made of Experimental Examples of the above processes for producing the powdery particles 111 and related Comparative Examples. (Note that, for better understanding, Experimental Examples and Comparative Examples will be described by denoting the same objects as in the above embodiments by the same reference numerals, i.e., as the raw material wood 101, the pulverized dust 102, the powdery particles 111 and the fixed particles 110).

Experimental Example A-1

Saw dust of a silver fir (Yeddo spruce) was sieved to have a particle size distribution shown in Table 1 was used as raw materials, i.e., the raw material wood 101, and was mechanically pulverized under such actions as impact, shearing and trituration, by using an impeller mill (Model IMP-250 by K.K. Seishin Enterprise) in which the clearance between the impact blades of the pulverizing rotor and the liner was set to 3 mm. As a result, the pulverized dust 102 having a particle size distribution shown in Table 2 was obtained.

TABLE 1

| Particle Size | Amount |
| --- | --- |
| below 297 μm sieve - | 2.33 wt % |
| above 297 μm sieve - below 350 μm sieve | 2.29 wt % |
| above 350 μm sieve - below 420 μm sieve | 7.21 wt % |
| above 420 μm sieve - below 500 μm sieve | 33.44 wt % |
| above 500 μm sieve - below 590 μm sieve | 40.98 wt % |
| above 590 μm sieve - below 710 μm sieve | 12.78 wt % |
| above 710 μm sieve - below 840 μm sieve | 0.65 wt % |
| above 840 μm sieve - below 1190 μm sieve | 0.32 wt % |
| above 1190 μm sieve | 0.00 wt % |

TABLE 2

| Particle Size | Amount |
| --- | --- |
| less than 0.2 μm | 0.0 wt % |
| not less than 0.2 μm - less than 0.4 μm | 0.1 wt % |
| not less than 0.4 μm - less than 0.6 μm | 0.1 wt % |
| not less than 0.6 μm - less than 0.8 μm | 0.1 wt % |
| not less than 0.8 μm - less than 1.0 μm | 0.1 wt % |
| not less than 1.0 μm - less than 1.5 μm | 0.4 wt % |
| not less than 1.5 μm - less than 2.0 μm | 0.7 wt % |
| not less than 2.0 μm - less than 3.0 μm | 1.2 wt % |
| not less than 3.0 μm - less than 4.0 μm | 0.9 wt % |

TABLE 2-continued

| Particle Size | Amount |
| --- | --- |
| not less than 4.0 μm - less than 6.0 μm | 1.5 wt % |
| not less than 6.0 μm - less than 8.0 μm | 2.2 wt % |
| not less than 8.0 μm - less than 12.0 μm | 4.1 wt % |
| not less than 12.0 μm - less than 16.0 μm | 4.0 wt % |
| not less than 16.0 μm - less than 24.0 μm | 7.8 wt % |
| not less than 24.0 μm - less than 32.0 μm | 8.2 wt % |
| not less than 32.0 μm - less than 48.0 μm | 14.2 wt % |
| not less than 48.0 μm - less than 64.0 μm | 10.5 wt % |
| not less than 64.0 μm - less than 96.0 μm | 31.2 wt % |
| not less than 96.0 μm - less than 128.0 μm | 11.0 wt % |
| not less than 128.0 μm - less than 192.0 μm | 1.7 wt % |

The pulverized dust 102 thus obtained was classified by using such a bulk specific gravity classifier of wind force type as shown in FIG. 4 (PS Separator by Pautec K.K.), and the pulverized dust 102 having a particle size distribution shown in Table 3 was obtained. The pulverized dust 102 thus classified was further pulverized under attrition action, i.e., subjected to the trituration process, for 2 hours by using a dry ball mill (Attriter A-200 by Mitsui Miike Chemical Machinery K.K.) of 5.4 liter capacity which had a stirring bar and in which 2.4 liter of pulverizing balls each having a diameter of 3 mm and made of zirconia-base ceramic were loaded. As a result, the powdery particles 111 increased in their bulk specific gravity and having a particle size distribution shown in Table 4 was obtained.

TABLE 3

| Particle Size | Amount |
| --- | --- |
| less than 0.2 μm | 0.0 wt % |
| not less than 0.2 μm - less than 0.4 μm | 0.3 wt % |
| not less than 0.4 μm - less than 0.6 μm | 0.4 wt % |
| not less than 0.6 μm - less than 0.8 μm | 0.7 wt % |
| not less than 0.8 μm - less than 1.0 μm | 0.9 wt % |
| not less than 1.0 μm - less than 1.5 μm | 2.9 wt % |
| not less than 1.5 μm - less than 2.0 μm | 5.9 wt % |
| not less than 2.0 μm - less than 3.0 μm | 14.3 wt % |
| not less than 3.0 μm - less than 4.0 μm | 15.0 wt % |
| not less than 4.0 μm - less than 6.0 μm | 16.5 wt % |
| not less than 6.0 μm - less than 8.0 μm | 11.2 wt % |
| not less than 8.0 μm - less than 12.0 μm | 12.1 wt % |
| not less than 12.0 μm - less than 16.0 μm | 7.9 wt % |
| not less than 16.0 μm - less than 24.0 μm | 6.3 wt % |
| not less than 24.0 μm - less than 32.0 μm | 3.1 wt % |
| not less than 32.0 μm - less than 48.0 μm | 0.8 wt % |
| not less than 48.0 μm - less than 64.0 μm | 0.0 wt % |
| not less than 64.0 μm - less than 96.0 μm | 1.7 wt % |

TABLE 4

| Particle Size | Amount |
| --- | --- |
| less than 0.2 μm | 0.0 wt % |
| not less than 0.2 μm - less than 0.4 μm | 0.3 wt % |
| not less than 0.4 μm - less than 0.6 μm | 0.6 wt % |
| not less than 0.6 μm - less than 0.8 μm | 1.0 wt % |
| not less than 0.8 μm - less than 1.0 μm | 1.3 wt % |
| not less than 1.0 μm - less than 1.5 μm | 4.5 wt % |
| not less than 1.5 μm - less than 2.0 μm | 8.1 wt % |
| not less than 2.0 μm - less than 3.0 μm | 14.6 wt % |
| not less than 3.0 μm - less than 4.0 μm | 13.0 wt % |
| not less than 4.0 μm - less than 6.0 μm | 13.5 wt % |
| not less than 6.0 μm - less than 8.0 μm | 13.0 wt % |
| not less than 8.0 μm - less than 12.0 μm | 12.0 wt % |
| not less than 12.0 μm - less than 16.0 μm | 10.9 wt % |
| not less than 16.0 μm - less than 24.0 μm | 6.6 wt % |
| not less than 24.0 μm - less than 32.0 μm | 0.6 wt % |
| not less than 32.0 μm - | 0.0 wt % |

It was found that the powdery particles 111 having the particle size distribution shown in Table 4 had the average particle size near that of the pulverized dust 102 having the particle size distribution shown in Table 3, but were reduced slightly in particle size and increased in bulk specific gravity as compared with the pulverized dust 102. More specifically, the pulverized dust 102 shown in Table 3 had the bulk specific gravity of 0.126 g/cc in a relatively loose state and the bulk specific gravity of 0.286 g/cc in a relatively compacted state, while the powdery particles 111 shown in Table 4 had the bulk specific gravity of 0.186 g/cc in a relatively loose state and the bulk specific gravity of 0.463 g/cc in a relatively compacted state. In other words, it was found that the bulk specific gravity of the powdery particles 111 was considerably increased with the trituration process.

Here, the bulk specific gravity in a relatively loose state represents a numerical value which was resulted by sprinkling the pulverized dust 102 or the powdery particles 111 into a container of 100 cc through a 24-mesh sieve to build up a heap of the pulverized dust 102 or the powdery particles 111 in the container, removing a portion of the heap above an upper edge of the container, and then dividing the total weight of the pulverized dust 102 or the wood powdery particles in the container by 100. Also, the bulk specific gravity in a relatively compacted state represents a numerical value which was resulted by sprinkling the pulverized dust 102 or the powdery particles 111 into a container of 100 cc similarly, but the container being vertically vibrated (subjected to tapping vibration), removing a portion of the heap above an upper edge of the container after the completion of change in bulk of the pulverized dust 102 or the wood powdery particles, and then dividing the total weight of the pulverized dust 102 or the powdery particles 111 in the container by 100.

Also, it was confirmed from the result of observation based on micrographs that the pulverized dust 102 shown in Table 3 before the trituration process included those particles having the size along the long axis greater than the size along the short axis, and most of the dust had angled portions, projecting portions and whisker-like portions in the form of cilia, whereas the powdery particles 111 shown in Table 4 had a rounder shape, i.e., closer to a granule as a whole, and their surfaces were relatively smooth and fine.

The powdery particles 111 thus obtained did not agglomerate together appreciably, dissolved in a solution or the like with good dispersity, and hence were a suitable carrier base material for a pigment and so on.

Experimental Example A-2

As with the above Example, saw dust of a silver fir (Yeddo spruce) having the particle size distribution shown in Table 1 was used as raw materials, i.e., the raw material wood 101, and was pulverized by using the same impeller mill as used in Experimental Example A-1 in which the clearance between the impact blades of the pulverizing rotor rotated at a high speed and the liner was set to 3 mm, whereby the pulverized dust 102 having the particle size distribution shown in Table 2 was obtained.

After that, the pulverized dust 102 thus obtained was further pulverized under attrition action between the pulverizing balls, i.e., subjected to the trituration process, for 2 hours by using a ball mill (Attriter A-200 by Mitsui Miike Chemical Machinery K.K.) of 5.4 liter capacity in which 2.4 liter of pulverizing balls each having a diameter of 3 mm and made of zirconia-base ceramic were loaded. As a result, the powdery particles 111 having a particle size distribution shown in Table 5 was obtained. Then, the powdery particles 111 thus obtained were classified by using such a bulk specific gravity classifier of wind force type as shown in FIG. 4 (PS Separator by Pautec K.K.), and the wood powdery particles having a particle size distribution shown in Table 6 was obtained.

TABLE 5

| Particle Size | Amount |
| --- | --- |
| less than 0.2 μm | 0.0 wt % |
| not less than 0.2 μm - less than 0.4 μm | 0.3 wt % |
| not less than 0.4 μm - less than 0.6 μm | 0.4 wt % |
| not less than 0.6 μm - less than 0.8 μm | 0.5 wt % |
| not less than 0.8 μm - less than 1.0 μm | 0.8 wt % |
| not less than 1.0 μm - less than 1.5 μm | 2.1 wt % |
| not less than 1.5 μm - less than 2.0 μm | 3.6 wt % |
| not less than 2.0 μm - less than 3.0 μm | 6.9 wt % |
| not less than 3.0 μm - less than 4.0 μm | 6.0 wt % |
| not less than 4.0 μm - less than 6.0 μm | 8.6 wt % |
| not less than 6.0 μm - less than 8.0 μm | 10.5 wt % |
| not less than 8.0 μm - less than 12.0 μm | 16.8 wt % |
| not less than 12.0 μm - less than 16.0 μm | 13.0 wt % |
| not less than 16.0 μm - less than 24.0 μm | 16.8 wt % |
| not less than 24.0 μm - less than 32.0 μm | 9.1 wt % |
| not less than 32.0 μm - less than 48.0 μm | 4.6 wt % |
| not less than 48.0 μm - | 0.0 wt % |

TABLE 6

| Particle Size | Amount |
| --- | --- |
| less than 0.2 μm | 0.0 wt % |
| not less than 0.2 μm - less than 0.4 μm | 0.3 wt % |
| not less than 0.4 μm - less than 0.6 μm | 0.5 wt % |
| not less than 0.6 μm - less than 0.8 μm | 0.7 wt % |
| not less than 0.8 μm - less than 1.0 μm | 0.9 wt % |
| not less than 1.0 μm - less than 1.5 μm | 2.4 wt % |
| not less than 1.5 μm - less than 2.0 μm | 5.2 wt % |
| not less than 2.0 μm - less than 3.0 μm | 15.8 wt % |
| not less than 3.0 μm - less than 4.0 μm | 18.8 wt % |
| not less than 4.0 μm - less than 6.0 μm | 22.1 wt % |
| not less than 6.0 μm - less than 8.0 μm | 14.8 wt % |
| not less than 8.0 μm - less than 12.0 μm | 10.6 wt % |
| not less than 12.0 μm - less than 16.0 μm | 5.2 wt % |
| not less than 16.0 μm - less than 24.0 μm | 2.3 wt % |
| not less than 24.0 μm - less than 32.0 μm | 0.4 wt % |
| not less than 32.0 μm - | 0.0 wt % |

It was confirmed from the result of observation based on micrographs that the powdery particles thus obtained were free from the angled portions, the projecting portions and the whisker-like portions in the form of cilia all found on the pulverized dust 102, their shapes were round as a whole, and their surfaces were relatively smooth and fine.

Further, the powdery particles 111 had the particle sizes distributing within a relatively narrow range, were superior in both fluidity and dispersity, and hence were a suitable carrier base material for a pigment and so on.

Comparative Example A-1

Saw dust of a silver fir (Yeddo spruce) having the particle size distribution shown in Table 1 was pulverized under attrition action between the pulverizing balls, i.e., subjected to the trituration process, for 2 hours by using a ball mill (Attriter A-200 by Mitsui Miike Chemical Machinery K.K.) of 5.4 liter capacity in which 2.4 liter of pulverizing balls each having a diameter of 3 mm and made of zirconia-base ceramic were loaded.

It was confirmed that wood powder thus obtained contained a ultrafine wood powder portion and a long fiber-like portion in mixed condition such that 70 wt % or more of the wood powder had the particle size still near that of the original dust, and the wood powder was not all granular in shape.

Thus, as opposed to each of the above Experimental Examples in which sawdust of a silver fir was pulverized by using the impeller mill beforehand to produce the pulverized dust 102 which was then further pulverized by attrition means to increase the bulk specific gravity, when sawdust was directly pulverized with the trituration process, the pulverizing efficiency was extremely low, a large amount of long fiber-like portions is left even after the pulverization for a long time, and on the other hand, ultrafine wood powder overly pulverized was produced.

The ultrafine wood powder overly pulverized caused an agglomeration and hence was not suitable for use.

Fixing of surface particles to first fixed particles

A description will now be made of details of means for producing the second fixed particles 110 which are obtained by fixing the surface particles, which are smaller in size and harder than the powdery particles 111, to the surfaces of the powdery particles 111.

The powdery particles 111 are desirably selected to have the particle size within a limited range as fine as possible. More specifically, when the objective substance for mixing is a paint to form a coating, it is preferable for the powdery particles 111 to have a particle size distribution such that a primary part of the powdery particles 111 falls in the range of 2 to 12 μm.

When the objective substance for mixing is a resin coating solution or a molding resin material such as a plastic sheet or a plastic film, the powdery particles 111 are preferably selected to have the particle size not greater than 32 μm, more preferably not greater than 20 μm. Another more effective particle size distribution is such that a part of the powdery particles 111 having the particle size not greater than 12 μm amounts to 75 wt % or more, preferably 80 wt % or more of the total weight.

When the objective substance for mixing is a plastic product produced by injection or extrusion molding, the powdery particles 111 are preferably selected to have the particle size in the range of 50 to 90 μm, more preferably not greater than 200 μm.

Further, when the objective substance for mixing is a product such as a plastic sheet which is shaped under kneading by shaping means such as a calender roll, the powdery particles 111 having the larger particle size than those mixed in molding resin materials for other types of plastic products can also be employed.

Next, the fixing of the surface particles 112 to the surfaces of the powdery particles 111, i.e., the fixing of the surface particles 112 under external pressing forces, is carried out by using any of various mixers which can produce external pressing forces applied to the surfaces of the powdery particles 111, having the increased bulk specific gravity, externally of the surfaces with the trituration process or the like.

The surface particles 112 are fixed to the powdery particles 111 primarily through the biting coupling. Since the plurality of surface particles 112 are often interfered with each other, e.g., through pushing therebetween, and heat is generated with the trituration process upon the biting coupling, the biting coupling of the surface particles 112 to the surfaces of the powdery particles 111 is accompanied with the embracing coupling by the surfaces, or with the sandwiching coupling effected between the surface particles 112 fixed by the biting coupling, and between the surface particles 112 fixed by the biting coupling and the surface particles 112 fixed by the embracing coupling, and therefore the very effective and extremely strong fixing, i.e., the fixing based on neither chemical reaction nor adhesion, can be achieved in combination of several condensing and reducing actions due to cooling after the fixing operation.

The fixing of the surface particles 112 to the powdery particles 111 may be performed by simultaneously supplying the powdery particles 111 and the surface particles 112 to an apparatus capable of generating the external pressing forces, e.g., a dry ball mill.

Alternatively, it is also possible to perform preliminary mixing for attaching the surface particles 112 to the surfaces of the powdery particles 111 beforehand to thereby prepare the powdery particles 111 under condition that the surface particles 112 are temporarily held on the particle surfaces, and supply those powdery particles 111 to an apparatus capable of generating the external pressing forces, e.g., a dry ball mill, so that the surface particles 112 on the particle surfaces are bitten into the powdery particles 111.

The fixing of the surface particles 112 to the surfaces of the powdery particles 111 may be achieved so as to cover either all over the surface of each of the wood powdery particles 112 or only a part of the surface.

Additionally, the surface particles 112 may be overlapped with each other to form a layer for covering the surfaces of the powdery particles 111.

Fixing of surface particles to second wood dust

A description will now be made of the fixing of the surface particles 122 to the pulverized dust 102 or the powdery particles 121 for the second fixed particles 120.

The fixing of the surface particles 122 to the powdery particles 121 for the second fixed particles 120 is performed by fixing the surface particles simultaneously with the process of obtaining the powdery particles 111 for the first fixed particles 110. Therefore, the apparatus used for the fixing, the molding means for the powdery particles 121, and the fixing means for the surface particles 122 are all the same as those used in the above case of the first fixed particles 110.

The second fixed particles 120 are obtained as follows. The pulverized dust 102, which is prepared by pulverizing sawdust or a crushed material, resulted coarsely crushing raw material wood or wood chips by a cutter mill, using a pulverizer, e.g., an impeller mill and by selectively sieving the pulverized dust 102 to have the particle size in a predetermined range, and the surface particles 122 are both subjected to the two following processes in parallel by using any pulverizing means under attrition action, e.g., a dry ball mill;

the process for increasing the bulk specific gravity of the pulverized dust 102, and the process for fixing of the surface particles 122 to the surfaces of the pulverized dust 102 and the powdery particles 121 having the increased bulk specific gravity.

Accordingly, the fixing of the surface particles is progressed through a step wherein the surface particles 122 are first fixed or temporarily fixed to the surfaces of the pulverized dust 102 and the surfaces of the pulverized dust 102 being increased in its bulk specific gravity, and is eventually fixed to the surfaces of the powdery particles 121 having the increased bulk specific gravity while the bulk specific gravity of the pulverized dust 102 is being increased, or a step wherein the surface particles 122 to the powdery particles 121 having the already sufficiently increased bulk specific gravity under the external pressing forces generated with the trituration process applied to the pulverized dust 102.

In any case, the surface particles 122 are eventually fixed to the surfaces of the powdery particles 121, thereby producing the second fixed particles 120.

As with the fixing of the surface particles 112 in the first fixed particles 110, the fixing of the surface particles 121 in the second fixed particles 120 is established through three primary couplings; i.e., the biting coupling to the surfaces of the powdery particles 121, the embracing coupling by the particle surfaces, and the sandwiching coupling between the surface particles 122 fixed through the biting coupling and the surface particles 122 fixed through the embracing coupling.

When the second fixed particles 120 as a final processed substance are required to have a limited range of particle size, the fixing process for the second fixed particles 120 is preferably performed by classifying the pulverized dust 102 once to have the particle sizes in a predetermined range and then supplying the selected pulverized dust 102 to the processing apparatus along with the surface particles 122, and when the particle size of the second fixed particles 120 is not required to meet any limitations, the pulverized dust 102 may be supplied without classification.

The fixing of the surface particles 122 to the surfaces of the pulverized dust 102 or the powdery particles 121 may be achieved so as to cover either all over the surface of each of the pulverized dust 102 or the powdery particles 121 or only a part of the surface.

Additionally, the surface particles 122 may be overlapped with each other to form a layer for covering the surfaces of the pulverized dust 102 or the powdery particles 111.

A description will now be made of the surface particles 112, 122 fixed to the surfaces of the powdery particles 111, 121.

The surface particles 112, 122 may be any of various pigments, various inorganic materials, various metallic materials, various plastic materials, and various conductive materials. In other words, the surface particles 112, 122 can be made of any materials so long as their hardness and size are enough to enable the materials to bite into the surfaces of the powdery particles 111, 121 (including the pulverized dust 102 in the second and four inventions).

Also, the surface particles 112, 122 used have properties depending on the usage of the fixed particles 110, 120.

Generally, it is preferably that the surface particles 112, 122 of the fixed particles 110, 120 be chemically and thermally stable so as not to detract from the characteristics of the fixed particles when applied, or to cause any adverse influence upon plastic products, coatings and so on finally formed.

Fixed particles having inorganic material particles

A description will now be made of the fixed particles 110, 120 in which an inorganic particulate material is fixed as the surface particles 112, 122 to the powdery particles 111, 121.

Here, the inorganic material used as the surface particles 112, 122 satisfies the specific conditions that it has a higher hardness than that of the powdery particles 111, 121 and the pulverized dust 102, and has the relatively small particle size with respect to the particle sizes of the powdery particles 111, 121 and the pulverized dust 102. The inorganic material used is selected from various inorganic materials, taking into account the usage conditions of the objective substance for mixing.

The powdery particles 111 and the powdery particles 121 (the pulverized dust 102 in this case) having, as the surface particles 121, 122, an inorganic material in the form of fine powder of calcium carbonate, by way of typical example, are preferably selected to have the particle size in a certain range in consideration of the usage of the fixed particles 110, 120, e.g., a plastic sheet or board, the usage of various extrusion or injection moldings, as well as application methods such as coating, injection molding, extrusion molding, and roll shaping.

For example, when the objective substance for mixing is a plastic film, a plastic sheet or the like, the powdery particles 111 or the pulverized dust 102 in the second fixed particles 120 are preferably selected to have the particle size not greater than 32 μm, more preferably not greater than 20 μm. Another more effective particle size distribution is such that a part of the particles or the dust having the particle size not greater than 12 μm amounts to 75 wt % or more, preferably 80 wt % or more of the total weight.

When the objective substance for mixing is a plastic product produced by injection or extrusion molding, the powdery particles 111 or the pulverized dust 102 in the second fixed particles 120 are preferably selected to have the particle size in the range of 50 to 90 μm, more preferably not greater than 200 μm.

Further, when the objective substance for mixing is a product such as a plastic sheet which is shaped under kneading by shaping means such as a calender roll, the powdery particles 111 or the pulverized dust 102 in the second fixed particles 120 having the larger particle size than cited above can also be employed.

Next, means for bearing inorganic material particles such as calcium carbonate powder, as the surface particles 112, 122, to the surfaces of the powdery particles 111, 121 and the pulverized dust 102 can be exactly the same as in the above case of obtaining the first and second fixed particles 110, 120, and the inorganic material particles are preferably fixed to the surfaces of the powdery particles 111, 121 as carrier bases through the biting coupling in such a manner as to cover all the surfaces.

The fixed particles 110, 120 obtained here showed good dimensional stability when applied to a plastic board or the like, and expansion and contraction of the plastic board upon temperature changes were extremely small.

Subsequently, a description will be made of Experimental Examples of the above processes for fixing fine powder of calcium carbonate, as the surface particles 112, 122, to the surfaces of the powdery particles 111, 121 and the pulverized dust 102 to thereby produce the fixed particles 110, 120. (Note that, for better understanding, Experimental Examples will be described by denoting the same objects as in the above embodiments by the same reference numerals, e.g., the raw material wood 101, the pulverized dust 102, the powdery particles 111, 121 and the fixed particles 110, 120).

Experimental Example B-1

As with the above Example, saw dust of a silver fir (Yeddo spruce) having the particle size distribution shown in Table 1 was used as raw materials, i.e., the raw material wood 101, and was pulverized under such actions as impact, shearing and trituration, by using an impeller mill (Model IMP-250 by K.K. Seishin Enterprise) in which the clearance between the impact blades of the pulverizing rotor rotated at a high speed and the liner was set to 3 mm, whereby the pulverized dust 102 having the particle size distribution shown in Table 2 was obtained.

The pulverized dust 102 thus obtained was classified to obtain the pulverized dust 102 having the particle size distribution shown in Table 3, and thereafter the pulverized dust 102 thus classified was subjected to the trituration process for 2 hours by using a dry ball mill (Attriter A-200 by Mitsui Miike Chemical Machinery K.K.) of 5.4 liter capacity in which 2.4 liter of pulverizing balls each having a diameter of 3 mm and made of zirconia-base ceramic were loaded, whereby the powdery particles 111 having the increased bulk specific gravity and the particle size distribution shown in Table 4 were obtained.

Further, 1.5 Kg of the powdery particles 111 thus obtained was added with 1.5 Kg of fine powder of calcium carbonate as the surface particles 112 such that the fine powder of calcium carbonate is sprinkled over the powdery particles 111. Then, the powdery particles 111 including the fine powder of calcium carbonate sprinkled over the same were mixed by using the dry ball mill (Attriter A-200 by Mitsui Miike Chemical Machinery K.K.) similarly to the above step. As a result, the fixed particles 110 in which the fine powder of calcium carbonate was fixed to the surfaces thereof as intended were obtained.

By using the fixed particles 110 thus obtained as a filler, a sheet of vinyl chloride resin was produced.

The fixed particles 110 were uniformly contained in the sheet of vinyl chloride resin, the sheet surface is free from a sticky feeling, and expansion and contraction of the sheet upon temperature changes were extremely small.

Experimental Example B-2

Saw dust was pulverized by using the impeller mill (Model IMP-250 by K.K. Seishin Enterprise), and the pulverized dust 102 having the particle size distribution shown in Table 7 was obtained.

TABLE 7

| Particle Size | Amount |
| --- | --- |
| less than 0.2 μm | 0.0 wt % |
| not less than 0.2 μm - less than 0.4 μm | 0.1 wt % |
| not less than 0.4 μm - less than 0.6 μm | 0.1 wt % |
| not less than 0.6 μm - less than 0.8 μm | 0.1 wt % |
| not less than 0.8 μm - less than 1.0 μm | 0.1 wt % |
| not less than 1.0 μm - less than 1.5 μm | 0.3 wt % |
| not less than 1.5 μm - less than 2.0 μm | 0.6 wt % |
| not less than 2.0 μm - less than 3.0 μm | 0.9 wt % |
| not less than 3.0 μm - less than 4.0 μm | 0.7 wt % |
| not less than 4.0 μm - less than 6.0 μm | 1.2 wt % |
| not less than 6.0 μm - less than 8.0 μm | 1.8 wt % |
| not less than 8.0 μm - less than 12.0 μm | 2.6 wt % |
| not less than 12.0 μm - less than 16.0 μm | 3.3 wt % |
| not less than 16.0 μm - less than 24.0 μm | 6.2 wt % |
| not less than 24.0 μm - less than 32.0 μm | 6.7 wt % |
| not less than 32.0 μm - less than 48.0 μm | 8.4 wt % |
| not less than 48.0 μm - less than 64.0 μm | 13.5 wt % |
| not less than 64.0 μm - less than 96.0 μm | 32.6 wt % |
| not less than 96.0 μm - less than 128.0 μm | 18.1 wt % |
| not less than 128.0 μm - less than 192.0 μm | 2.7 wt % |

After sprinkling 0.7 Kg of fine powder of calcium carbonate, as the surface particles 122, over 1 Kg of the pulverized dust 102 obtained as above, the pulverized dust 102 including the fine powder of calcium carbonate thereon were subjected to the trituration process by using the dry ball mill (Attriter A-200 by Mitsui Miike Chemical Machinery K.K.) for 2 hours.

With the trituration process using the ball mill, the surface configuration of the pulverized dust 102 was trimmed and the fixed particles 120 in which the fine powder of calcium carbonate was bitten into the surfaces of the wood powdery particles 121 having the trimmed surface configuration were obtained.

Then, by using the fixed particles 120 thus obtained as a filler, a bar of vinyl chloride resin was produced by extrusion molding.

The fixed particles 120 were uniformly contained in the bar of vinyl chloride resin, the bar surface is free from a sticky feeling, and expansion and contraction of the bar upon temperature changes were extremely small.

Fixed particles having pigment particles

A description will now be made of pigment particles as the surface particles 112, 122 and the fixed particles 110, 120 in which the pigment particles are fixed to the surfaces of the powdery particles 111, 121.

Here, any kinds of pigments, either an inorganic or organic pigment, can be used to provide the pigment particles as the surface particles 112, 122 so long as the pigment is selected to satisfy the specific conditions that it has a higher hardness than that of the powdery particles 111, 121 and the pulverized dust 102, and has the relatively small particle size with respect to the particle sizes of the powdery particles 111, 121 and the pulverized dust 102, taking into account the usage conditions of the objective substance for mixing, particularly, heat resistance.

The powdery particles 111 and 121 (the pulverized dust 102 in this case) for bearing the pigment particles as the surface particles 112, 122 are desirably selected to have the particle size within a limited range as fine as possible.

More specifically, when the objective substance for mixing is a paint to form a coating, it is preferable for the powdery particles 111 or the pulverized dust 102 in the second fixed particles 120 to have a particle size distribution such that a primary part of the powdery particles 111 the pulverized dust 102 falls in the range of 2 to 12 μm.

When the objective substance for mixing is a plastic material such as a plastic film or sheet, the powdery particles 111 or the pulverized dust 102 in the second fixed particles 120 are preferably selected to have the particle size not greater than 32 μm.

Another more effective particle size distribution is such that a part of the particles or the dust having the particle size not greater than 12 μm amounts to 75 wt % or more, preferably 80 wt % or more of the total weight.

When the objective substance for mixing is a plastic product produced by injection or extrusion molding, the powdery particles 111 or the pulverized dust 102 in the second fixed particles 120 are preferably selected to have the particle size in the range of 50 to 90 μm, more preferably not greater than 200 μm.

Further, when the objective substance for mixing is a plastic sheet or the like which is shaped under kneading by shaping means such as a calender roll, the powdery particles 111 or the pulverized dust 102 in the second fixed particles 120 having the larger particle size than cited above can also be employed.

Next, means for bearing the pigment particles, as the surface particles 112, 122, to the surfaces of the powdery particles 111, 121 and the pulverized dust 102 can be exactly the same as in the above embodiment. The pigment particles are preferably fixed to the surfaces of the powdery particles 111, 121 as carrier bases through the biting coupling in such a manner as to cover all the surfaces.

The amount of pigment particles mixed as the surface particles 112, 122 is optionally set depending on the desired tint of an objective color. It was found that the fixed particles 110, 120 bearing the pigment particles thereon showed substantially the same color tone as that of the pigment particles mixed and had good fluidity.

Further, when the fixed particles 110, 120 bearing the pigment particles thereon were mixed and dispersed in a plastic molding material, the molding pressure required in each of injection and extrusion molding was low, the mixed pigment was uniformly dispersed in a resultant molding, and variations in color tint were not found.

Subsequently, a description will be made of Experimental Examples of the above processes for fixing the pigment particles, as the surface particles 112, 122, to the surfaces of the powdery particles 111, 121 and the pulverized wood dust 102 to thereby produce the fixed particles 110, 120. (Note that, for better understanding, Experimental Examples will be described by denoting the same objects as in the above embodiments by the same reference numerals, e.g., the raw material wood 101, the pulverized dust 102, the powdery particles 111, 121 and the fixed particles 110, 120).

Experimental Example C-1

As with the above Example, saw dust of a silver fir (Yeddo spruce) having the particle size distribution shown in Table 1 was used as raw materials, i.e., the raw material wood 101, and was mechanically pulverized under such actions as impact and trituration, by using an impeller mill (Model IMP-250 by K.K. Seishin Enterprise) in which the clearance between the impact blades of the pulverizing rotor rotated at a high speed and the liner was set to 3 mm, whereby the pulverized dust 102 having the particle size distribution shown in Table 2 was obtained.

The pulverized dust 102 thus obtained was classified to obtain the pulverized dust 102 having the particle size distribution shown in Table 3, and thereafter the pulverized dust 102 thus classified was subjected, as with the above Example, to the trituration process for 2 hours by using a dry ball mill (Attriter A-200 by Mitsui Miike Chemical Machinery K.K.) of 5.4 liter capacity in which 2.4 liter of pulverizing bails each having a diameter of 3 mm and made of zirconia-base ceramic were loaded, whereby the wood dust or powdery particles 111 having the increased bulk specific gravity and the particle size distribution shown in Table 4 were obtained.

Further, 1 Kg of the powdery particles 111 thus obtained was added with 0.7 Kg of titanium oxide particles as the pigment particles such that the titanium oxide particles are sprinkled over the powdery particles 111. Then, the powdery particles 111 including the titanium oxide particles thereon were mixed by using the same ball mill as above and, the fixed particles 110 in which the titanium oxide particles were fixed to the surfaces thereof were obtained.

It was confirmed from the result of observation based on micrographs that the fixed particles 110 having the titanium oxide particles fixed to the surfaces thereof were held in condition wherein the titanium oxide particles as the surface particles were bitten into the surfaces of the powdery particles 111 as carrier bases. Further, the fixed particles 110 were white as a whole corresponding to the specific color of the titanium oxide particles, and had good fluidity and dispersity with respect to a solution. Additionally, a plastic board molded by using the fixed particles 110 as a pigment showed a very small degree of expansion and contraction upon temperature changes.

Experimental Example C-2

Saw dust was pulverized by using an impeller mill (Model IMP-250 by K.K. Seishin Enterprise) to prepare 1.5 Kg of the pulverized dust 102 having the particle size distribution shown in Table 7. After sprinkling fine particles of titanium oxide as the surface particles 122 over the pulverized dust 102, the pulverized dust 102 including the fine particles of titanium oxide sprinkled thereon was subjected to the trituration process for 2 hours by using a dry ball mill (Attriter A-200 by Mitsui Miike Chemical Machinery K.K.).

With the trituration process using the ball mill, angled portions, projecting portions and whisker-like portions in the form of cilia on the pulverized dust 102 were removed, and the resultant powdery particles 121 had a more granular shape as a whole.

For the fixed particles 120 obtained here, it was found that the fine particles of titanium oxide were fixed by being bitten into to the surfaces of the powdery particles 121 of the fixed particles 120.

As a result of forming a plastic board molded by using the fixed particles 120 obtained here as a pigment, a white board with no variations in color tint could be obtained. The board had a good texture feeling free from a sticky feeling, and showed a very small degree of expansion and contraction upon temperature changes.

Additionally, the biting condition of the pigment particles as the surface particles 112, 122 into the surfaces of the powdery particles 111, 121 and the pulverized dust 102 as carrier bases can be improved to provide a more preferable result by applying a stronger mechanical impact during the trituration princess. Apart from the above Experimental Examples, as a result of using a ball mill having a vertical stirring blade, for example, and fixing the pigment particles as the surface particles 112, 122 to the pulverized dust 102 and the powdery particles 111 through the biting coupling under actions of trituration and dropping impact, the fixed particles 110, 120 having a still fresher color tone were obtained.

Fixed particles having conductive fine particles

A description will now be made of the fixed particles 110, 120 in which conductive fine particles are fixed as the surface particles 112, 122 to the surfaces of the powdery particles 111, 121.

Here, any kinds of fine particles having electrical conductivity can be used to provide the conductive fine particles as the surface particles 112, 122 so long as the conductive fine particles are selected to satisfy the specific conditions that they have a higher hardness than that of the powdery particles 111, 121 and the pulverized dust 102, and have the relatively small particle size with respect to the particle sizes of the powdery particles 111, 121 and the pulverized dust 102, taking into account the usage conditions of the objective substance for mixing, for example, heat resistance.

Examples of the conductive fine particles are fine particles of conductive metals such as Ag, Cu and Ni, fine particles of conductive metal oxides such as $SnO_2$ and ZnO, as well as carbon-base conductive fine particles, one or more of which may be selectively employed.

The fixed particles 110, 120 in which the conductive fine particles as the surface particles 112, 122 are fixed to the surfaces of the powdery particles 111, 121 and the pulverized dust 102 through the biting coupling can be used as a conductive filler for a paint, e.g., an electromagnetic shielding material, a radio wave absorbing material and an electrostatic charge preventing material, by being mixed and dispersed in solutions of various resin paints.

Next, the powdery particles 111 and the powdery particles 121 (the pulverized dust 102 in this case) for bearing the conductive fine particles as the surface particles 112, 122 are desirably selected to have the particle size within a limited range as fine as possible.

For example, it is preferable for the powdery particles 111 or the pulverized dust 102 in the second fixed particles 120 to have a particle size distribution such that a primary part of the powdery particles 111 or the pulverized dust 102 falls in the range of 2 to 12 μm. In another preferable particle size distribution, the powdery particles 111 or the pulverized dust 102 in the second fixed particles 120 are selected to have the particle size not greater than 32 μm more preferably not greater than 20 μm. Still another more effective particle size distribution is such that a part of the particles of the dust having the particle size not greater than 12 μm amounts to 75 wt % or more, preferably 80 wt % or more of the total weight.

Means for bearing the conductive fine particles, as the surface particles 112, 122, the surfaces of the powdery particles 111, 121 and the pulverized dust 102 can also be the same as in the above embodiments. The conductive fine particles are preferably fixed to the surfaces of the powdery particles 111, 121 as carrier bases through the biting coupling in such a manner as to cover all the surfaces. It was found that the fixed particles 110, 120 bearing the conductive fine particles thereon had good fluidity and dispersity.

The amount of conductive fine particles borne on the powdery particles 111, 121 is only required to satisfy the conductivity necessary in each of various applications. Basically, the amount of conductive fine particles is increased to such an extent that the borne conductive fine particles establish an electrically connected relation therebetween and the required conductivity is satisfied.

Subsequently, a description will be made of Experimental Examples of the above processes for fixing the conductive fine particles, as the surface particles 112, 122, to the surfaces of the powdery particles 111, 121 and the pulverized dust 102 to thereby produce the fixed particles 110, 120, including related Comparative Examples. (Note that, for better understanding, Experimental Examples will be described by denoting the same objects as in the above embodiments by the same reference numerals, e.g., the raw material wood 101, the pulverized dust 102, the powdery particles 111, 121 and the fixed particles 110, 120.

Experimental Example D-1

Saw dust of a silver fir (Yeddo spruce) having the particle size distribution shown in Table 1 was used as raw materials, i.e., the raw material wood 101, and was pulverized under such actions as impact, shearing and trituration, by using an impeller mill (Model IMP-250 by K.K. Seishin Enterprise) in which the clearance between the impact blades the pulverizing rotor rotated at a high speed and the liner was set to 3 mm, whereby the pulverized dust 102 having the particle size distribution shown in Table 2 was obtained.

The pulverized dust 102 thus obtained was classified obtain the pulverized dust 102 having the particle size distribution shown in Table 3, and thereafter the pulverized dust 102 thus classified was subjected, as with the above Example, to the trituration process for 2 hours by using a dry ball mill (Attriter A-200 by Mitsui Miike Chemical Machinery K.K.) of 5.4 liter capacity in which 2.4 liter of pulverizing balls each having a diameter of 3 mm and made of zirconia-base ceramic were loaded, whereby the powdery particles 111 having the increased bulk specific gravity and the particle size distribution shown in Table 4 were obtained.

Further, the powdery particles 111 thus obtained was added with carbon fine particles as the conductive fine particles in an amount enough to conceal the particle surfaces. In this Experimental Example, 50 weight parts of carbon fine particles are sprinkled over 100 weight parts of the powdery particles 111. Then, the powdery particles 111 including the carbon fine particles sprinkled thereon were mixed by using the same ball mill as above and, the fixed particles 110 in which the carbon fine particles were fixed to the surfaces thereof were obtained.

Subsequently, a coating solution was prepared by adding 20 weight parts of a urethane resin 60 weight parts of solvent in which dimethylformamide and methylethylketone were mixed with each other at the ratio of 1:1. After mixing the fixed particles 110 bearing the carbon fine particles thereon in the coating solution such that the solid urethane resin component in the coating solution and the fixed particles 110 were 1:1 in weight ratio, the mixture was kneaded for about 10 minutes by using a ball mill, whereby a conductive paint was obtained.

As a result of using the conductive paint thus obtained, forming a coating film being about 21 μm thick and measuring a surface electrical resistance value of the coating film, it was found that the measured value was in the range of $1\times10^7\Omega$ to $1\times10^8\Omega$ and hence the coating film had good conductivity.

Also, after mixing the fixed particles 110 bearing the carbon fine particles thereon in the above coating solution such that the solid urethane resin component in the coating solution and the fixed particles 110 were 1:2 in weight ratio, the mixture was kneaded for about 10 minutes, whereby a conductive paint was obtained.

As a result of using the conductive paint thus obtained and forming a coating film being about 28 μm thick, it was found that the surface of the coating film had conductivity.

Experimental Example D-2

The raw material wood 101 was pulverized to prepare the pulverized dust 102 having the particle size distribution shown in Table 2, and thereafter the obtained pulverized dust 102 was classified to obtain the pulverized dust 102 having the particle size distribution shown in Table 3, in the same manner as in the above Experimental Example D-1.

After sprinkling 1 Kg of carbon fine particles as the surface particles 122 over 2 Kg of the pulverized dust 102 obtained above, the pulverized dust 102 including the carbon fine particles sprinkled thereon was subjected to the trituration process for 2 hours by using a dry ball mill (Attriter A-200 by Miike Chemical Machinery K.K.), whereby the fixed particles 120 were obtained.

It was found that the obtained fixed particles 120 had the trimmed surfaces, their bulk specific gravity was increased, and the carbon fine particles were fixed by being bitten into the surfaces of the fixed particles 120.

As a result of forming a coating film by using a paint in which the fixed particles 120 were employed as a filler and measuring an electrical resistance value of the coating film, the conductivity close to that obtained in the above Experimental Example D-1 was found.

Comparative Example D-1

After adding 30 weight parts of carbon fine particles to 100 weight parts of a urethane resin solution of 30% concentration, the mixture was kneaded for about 10 minutes by using a ball mill, whereby a conductive paint was obtained.

As a result of using the conductive paint thus obtained, forming a coating film being about 21 μm thick and measuring a surface electrical resistance value of the coating film, it was found that the measured value was $1\times10^9\Omega$ in any portions of the coating film surface and the carbon fine particles were agglomerated together in the coating film.

Then, as a result of continuing the kneading of the urethane resin solution and the carbon fine particles and measuring a surface electrical resistance value of the coating film at preset intervals of kneading time so that the surface electrical resistance value of the coating film formed became below $1\times10^8\Omega$, it was found the surface electrical resistance value of the coating film formed was reduced down to $1\times10^8\Omega$ only after the continuous kneading for 40 to 50 hours using the ball mill.

Comparative Example D-2

The raw material wood 101 was pulverized to prepare the pulverized dust 102 having the particle size distribution shown in Table 2, and thereafter the obtained pulverized dust 102 was classified to obtain the pulverized dust 102 having the particle size distribution shown in Table 3, in the same manner as in the above Experimental Example D-1.

The pulverized dust 102 thus classified was subjected to the trituration process for 2 hours by using a dry ball mill (Attriter A-200 by Mitsui Miike Chemical Machinery K.K.) of 5.4 liter capacity in which 2.4 liter of pulverizing balls each having a diameter of 3 mm and made of zirconia-base ceramic were loaded, whereby the powdery particles 111 having the particle size distribution shown in Table 4 were obtained.

Then, after preparing a urethane resin solution of 25% concentration diluted with a solvent in which dimethylformamide and methylethylketone were mixed with each other at the ratio of 1:1 and mixing the powdery particles 111 and carbon fine particles in the urethane resin solution such that the ratio of the powdery particles 111:the carbon fine particles:the solid component in the urethane resin solution was 2:1:3 in weight, the mixture was kneaded for about 10 minutes by using a ball mill, whereby a conductive paint was obtained.

As a result of using the conductive paint thus obtained, forming a coating film being about 21 μm thick and measuring a surface electrical resistance value of the coating film, it was found that the measured value was $1\times10^9\Omega$ in any portions of the coating film surface and the carbon fine particles were agglomerated together in the coating film.

Then, as a result of continuing the kneading of the urethane resin solution, the powdery particles 111 and the carbon fine particles and measuring a surface electrical resistance value of the coating film at preset intervals of kneading time so that the surface electrical resistance value of the coating film formed became below $1\times10^8\Omega$, it was found the surface electrical resistance value of the coating film formed was reduced down to $1\times10^8\Omega$ only after the continuous kneading for about 4 hours using the ball mill.

Comparative Example D-3

A conductive paint was obtained on the same conditions as in the above Comparative Example D-2 except for mixing the powdery particles 111 and carbon fine particles in the above urethane resin solution such that the powdery particles 111, the carbon fine particles and the solid component in the urethane resin solution were 4:2:3 in weight ratio. As a result of using the conductive paint thus obtained, forming a coating film being about 28 μm thick and measuring a surface electrical resistance value of the coating film, it was found that the measured value was $1\times10^9\Omega$ in any portions of the coating film surface and the carbon fine particles were also agglomerated together in the coating film.

Fixed particles having surface particles other than above and fixed particles having surface particles of different properties In the above embodiments, an inorganic material, a pigment, a conductive material and a metallic material have been described as being advantageously employed as the surface particles 112, 122 fixed to the surfaces of the powdery particles 111, 121 and the pulverized dust 102.

The present invention involves, as will be apparent from the above description of the embodiments, the use of particles made of materials other than an inorganic material, a pigment, a conductive material and a metallic material to produce the surface particles 112, 122.

In other words, for example, any particles made of various plastics, which have an increased bulk specific gravity and are smaller in size and harder than the powdery particles 111, 121 and the pulverized dust 102, can be used as the surface particles 112, 122 fixed to the powdery particles 111 and the pulverized dust 102 or the powdery particles 121 in the second fixed particles 120, as with the above embodiments.

It is often desired to provide the resultant fixed particles 110, 120 with composite functions, e.g., conductivity and coloring, at the same time. In this case, by fixing a pigment and a conductive material to the surface of each of the powdery particles 121, the 111, fixed particles 110, 120 having both functions conductivity of and coloring can be produced.

When producing the fixed particles 110, 120 having composite functions, in order that various functions required for the fixed particles 110, 120 are effectively provided to plastic products obtained by using the fixed particles 110, 120, plural kinds of the surface particles 112, 122 having respective functions are prepared and fixed to the powdery particles 111, 121 and the pulverized dust 102 at a mixing ratio suitable for causing the fixed particles 110, 120 to exhibit the respective functions required.

The fixed particles 110, 120 thus obtained can be used in various forms, e.g., that they are employed as a filler for various plastic produces, are added to a paint or the like, and are compacted to form a board.

As will be apparent from the above embodiments, since the pulverized dust 102 is further pulverized under attrition action between the pulverizing balls, fiber-like portions projecting in form of whiskers from the pulverized dust 102 are removed away or pressed against the dust surface to provide the powdery particles 111, 121 having the increased bulk specific gravity, and the various surface particles 112, 122 are fixed to the powdery particles 111, 121. Therefore, the resultant first fixed particles 110 and second fixed particles 120 both have good fluidity and dispersity in a solvent or the like.

Also, the surface particles 112, 122 can be uniformly and easily fixed to the surfaces of the pulverized dust 102 and the surfaces of the powdery particles 111, 121 and, in addition, the surface particles 112, 122 can be stably fixed to the surfaces of the pulverized dust 102 and the surfaces of the powdery particles 111, 121 in terms of thermal and chemical properties.

Since the surfaces of the fixed particles 110, 120 produced are covered with the surfaces particles 112, 122, the various characteristics and functions of the woody material left in the pulverized dust 102 or the powdery particles 111, 121 forming the fixed particles 110, 120 are effectively protected by the surface particles 112, 122.

By producing the fixed particles 110, 120 in which the various characteristics and functions of the raw material wood are left therein and one or plural kinds of the surface particles 112, 122 having various functions, e.g., the fine particles 111, 112 of a pigment, an inorganic material, a conductive material, a metallic material and plastic material, to the surfaces thereof, the various characteristics and functions of the raw material wood and the various characteristics and functions of the surface particles 112, 122 fixed to the surfaces of the fixed particles 110, 120 can be provided to the objective substance for use in a combined manner.

By fixing the surface particles 112, 122 having the relatively small particle size to the surfaces of the pulverized dust 102 or the powdery particles 111, 121, it is possible not only to prevent the surface particles 112, 122 from agglomerating together, but also to more effectively provide the objective substance for use with the various characteristics and functions of the surface particles 112, 122.

Further, by fixing the surface particles 112, 122 having the relatively small particle size to the surfaces of the pulverized dust 102 or the powdery particles 111, 121, the fixed particles 110, 120 are obtained as particles which have the particle size much greater than that of each of the surface particles 112, 122, and which have the same functions and characteristics as those of the surface particles 112, 122. Therefore, the functions and characteristics of the surface particles 112, 122 can be more effectively provided to the objective substance for use, and the fixed particles 110, 120 can be used in a coating solution or the like while being less susceptible precipitation.

In addition to the above-described materials of the surface particles 112, 122, white carbon, lithopone, urea and phenol, for example, may also be used for the surface particles 112, 122.

Figure 5:
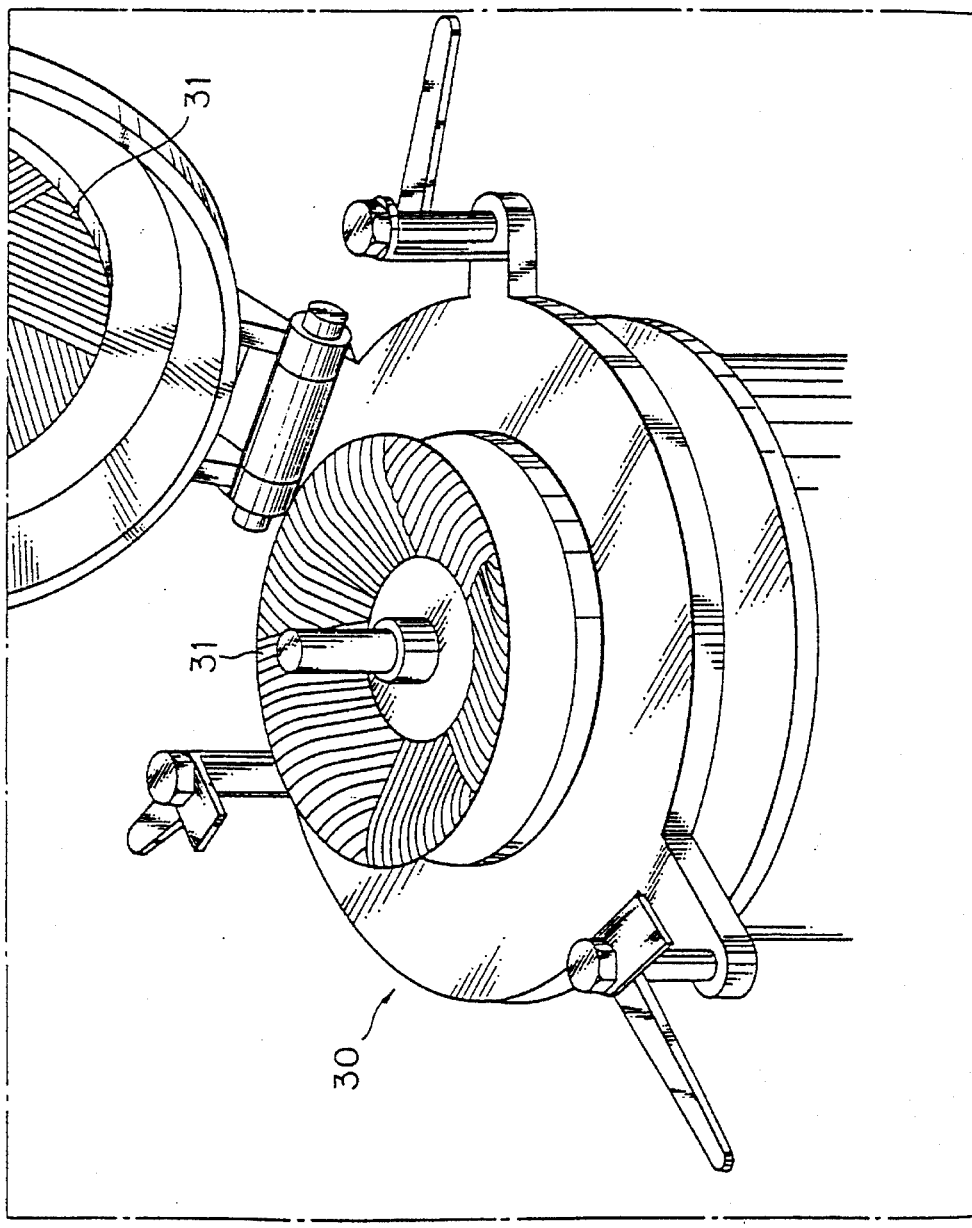
FIG. 5 is a schematic view showing one example of a triturator for use in the trituration process.

In the above description, a ball mill is employed to further pulverize the pulverized dust 102 with the trituration process. However, the trituration process can also be performed by using a triturator 30 shown in FIG. 5, for example, instead of such a ball mill.

The triturator 30 utilizes the principle of a stone mill and is arranged such that the pulverized dust 102 is put between a pair of whetstones 31, 31 facing each other with a predetermined gap left therebetween, and one whetstone 31 is rotated at a high speed, making the pulverized dust 102 subjected to the pulverization process and the grinding process, i.e., the trituration process.

Figure 6:
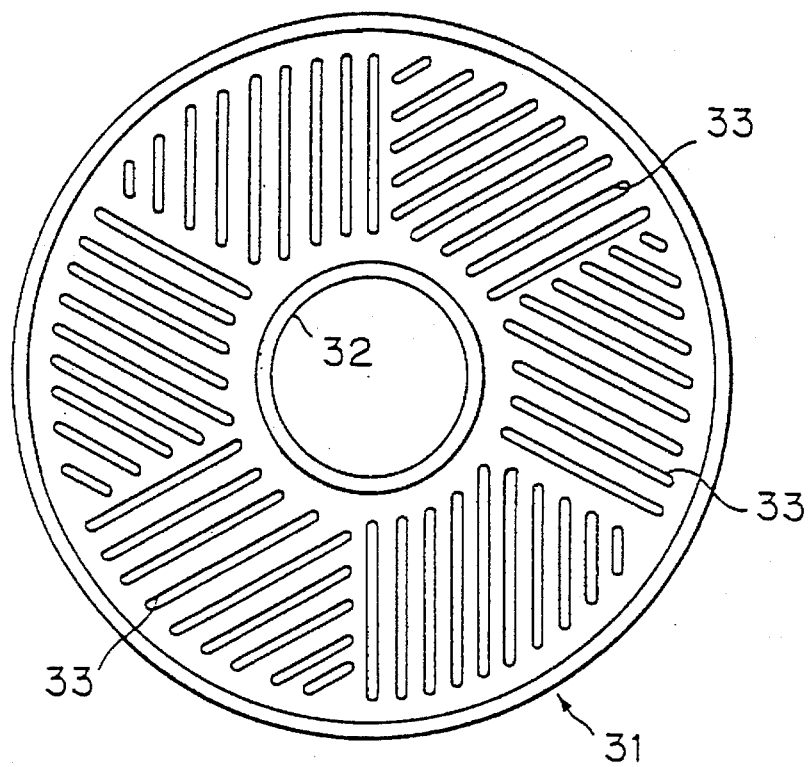
FIG. 6 is a plan view showing one example of a whetstone of the triturator shown in FIG. 5.

The whetstone 31 has a saucer-like shape with its inner surface gradually sloping upwards or downwards toward the center. The pair of whetstones are arranged in an opposite relation such that the gap therebetween is wide in central portions and narrow in peripheral portions. As shown in FIG. 6, the whetstone 31 is formed of a donut-shaped plate which has an attachment hole 32 defined at the center and number of feed grooves 33··· formed in its inner surface. The feed grooves 33 serve to smoothly guide a substance being processed in the radial direction of the whetstone 31 under centrifugal forces generated with rotation of the whetstone 31.

For subjecting the pulverized dust 102 to the trituration process by the triturator 30, the pulverized dust 102 is loaded between the central portions of the two whetstones 31, 31 and one whetstone 31 is then rotated at a high speed. The pulverized dust 102 is progressively pulverized between the two whetstones 31, 31 under centrifugal forces, impact forces, shearing forces, etc. As the particle size becomes smaller, the pulverized dust 102 is radially moved toward the outer periphery along the feed grooves 33·· under the centrifugal forces. During the movement toward the outer periphery, the pulverized dust 102 is further pulverized under impact forces and shearing forces, while the circumferential surface (outer surface) thereof is subjected to the grinding process. As a result of the above trituration process, the pulverized dust 102 turns to the powdery particles 111, 121 which have less fiber-like projecting portions on the circumferential surface and are independently in the form of a granule.

As with the case of employing a hall mill, the pulverized dust 102 thus obtained is classified to have the particle size in a desired range for conversion into the powdery particles 111, 121 to which the fixed particles 110, 120 are fixed. Then, by fixing the surface particles 112, 122 to the powdery particles 111, 121, the fixed particles 110, 120 are obtained.

A description will now be made of the process of producing a molding from the fixed particles 110, 120 obtained as above by extrusion or injection molding.

The shaping method to produce such a molding is primarily divided into two types below.

The first shaping method comprises mixing the fixed particles 110, 120 produced as above with a resin and a pigment to form a compound, melting the compound, and then molding the melted compound into the desired shape by extrusion or injection molding.

The second shaping method comprises mixing the fixed particles 110, 120 produced as above with a resin and a pigment, melting the mixture once for extruding the mixture to form a pellet, and then melting the pellet again, before actually molding it to the desired shape by extrusion or injection molding.

Of course, the above two shaping methods can be employed in a combined manner such that the compound and the pellet are combined with each other in a molten state as desired before the molding.

Examples of the resin used herein include vinyl chloride resin, foamed vinyl chloride resin, polyethylene resin, polypropyrene resin, phenol resin, urethane resin, polyurethane resin, ABS resin, and polystyrene resin. Above all, vinyl chloride resin, polyethylene resin and polypropyrene resin are preferable.

With any of the two shaping methods, since the fixed particles 110, 120 formed by fixing the surface particles 112, 122 to the powdery particles 111, 191 are used, a molding having a wood-like touch feeling can be manufactured.

To put it in more detail, the shaping method can be practiced in the following various measures:

1 A wood-like aspect forming material compound in which the fixed particles 110, 120 are mixed with a resin and a pigment is directly employed as a molding material.

2 A wood-like aspect forming material pellet in which the fixed particles 110, 120 are mixed with a resin and a pigment is prepared and only this pellet is employed for the molding.

3 A wood-like aspect forming material pellet in which the fixed particles 110, 120 are mixed with resin and a pigment is prepared and a different pigment from that used in the pellet is added to the pellet before the molding.

4 A wood-like aspect forming material pellet in which the fixed particles 110, 120 are mixed with a resin and a pigment is prepared in plural kinds containing different pigments, and two or more kinds of these pellets containing different pigments are mixed with each other and employed for the molding.

5 A ground material pellet in which the fixed particles 110, 120 are mixed with a resin and a wood-like aspect forming material pellet in which the fixed particles 110, 120 are mixed with a resin and a pigment are mixed together and employed for the molding.

6 A resin pellet made of a resin only, a ground material pellet in which the fixed particles 110, 120 are mixed with a resin, and a wood-like aspect forming material pellet in which the fixed particles 110, 120 are mixed with a resin and a pigment are mixed together and employed for the molding.

7 A ground material pellet in which the fixed particles 110, 120 are mixed with a resin and a pigment pellet in which a resin and a pigment are mixed with each other are mixed together and employed for the molding.

8 A wood-like aspect forming material pellet in which the fixed particles 110, 120 are mixed with a resin and a pigment and a pigment pellet in which a resin and a pigment are mixed with each other are mixed together and employed for the molding.

9 A wood-like aspect forming material pellet in which the fixed particles 110, 120 are mixed with a resin and a pigment and a wood-like aspect forming material compound in which the fixed particles 110, 120 are mixed with a resin and a pigment are mixed together and employed for the molding.

10 A wood-like aspect forming material pellet in which the fixed particles 110, 120 are mixed with a resin and a pigment and a ground material compound in which the fixed particles 110, 120 are mixed with a resin are mixed together and employed for the molding.

11 A wood-like aspect forming material pellet in which the fixed particles 110, 120 are mixed with a resin and a pigment and a pigment compound in which a resin and a pigment are mixed with each other are mixed together and employed for the molding.

12 A ground material pellet in which the fixed particles 110, 120 are mixed with resin and a wood-like aspect forming material compound in which the fixed particles 110, 120 are mixed with a resin and a pigment are mixed together and employed for the molding.

13 A ground material pellet in which the fixed particles 110, 120 are mixed with a resin and a pigment compound in which a resin and a pigment are mixed with each other are mixed together and employed for the molding.

14 A pigment pellet in which a resin and a pigment are mixed with each other and a wood-like aspect forming material compound in which the fixed particles 110, 120 are mixed with a resin and a pigment are mixed together and employed for the molding.

These fourteen shaping methods will be described below one by one.

First shaping method

A wood-like aspect forming material compound in which the fixed particles 110, 120 are mixed with a resin and a pigment is directly employed as a molding material.

In this case, when the molding is performed in condition that the fixed particles 110, 120 are completely mixed with the resin and the pigment, the resultant molding is substantially uniformly colored. Even in this condition, however, a touch feeling of the molding is close to that of wood.

When the molding is performed in condition that the pigment is not completely uniformly mixed with the fixed particles 110, 120 and the resin, the pigment is forced to flow over the molding surface, and the flown pigment exhibits a grain pattern close to the natural grain.

Second shaping method

A wood-like aspect forming material pellet in which the fixed particles 110, 120 are mixed with resin and a pigment is prepared and only this pellet is employed for the molding.

In this case, since the pellet is prepared in condition that the fixed particles 110, 120 are completely mixed with the resin and the pigment, the molding produced by using this pellet is substantially uniformly colored. Even in this condition, however, a touch feeling of the molding is close to that of wood.

Third shaping method

A wood-like aspect forming material pellet in which the particles 110, 120 are mixed with a resin and a pigment is prepared and a different pigment from that used in the pellet is added to the pellet before the molding.

In this case, when the pellet is prepared in condition that the fixed particles 110, 120 are completely mixed with a resin and a pigment, and the molding is performed in condition that the melted pigment and the different pigment are completely mixed with each other, the resultant molding is substantially uniformly colored. Even in this condition, however, a touch feeling of the molding is close to that of wood.

The different pigment added to a molten state of the wood-like aspect forming material pellet before the molding may not completely mix with the wood-like aspect forming material pellet. When the molding is performed in that condition, the pigment not completely mixed exhibits a stripe pattern to thereby form a grain pattern much closer to the natural grain than would be the case of molding only the wood-like aspect forming material compound or pellet in which the fixed particles 110, 120 are mixed with a resin and a pigment, by extrusion or injection molding.

Fourth shaping method

A wood-like aspect forming material pellet in which the fixed particles 110, 120 are mixed with a resin and a pigment is prepared in plural kinds containing different pigments, and two or more kinds of these pellets containing different pigments are mixed with each other and employed for the molding.

In this case, when the molding is performed in condition that the plural kinds of wood-like aspect forming material pellets are completely mixed together, the resultant molding is substantially uniformly colored. Even in this condition, however, a touch feeling of the molding is close to that of wood.

When the molding is performed in the condition that the plural kinds of wood-like aspect forming material pellets are not completely mixed together, the pigment in one wood-like aspect forming material pellet is not completely mixed with the pigment in other at least one wood-like aspect forming material pellet, and hence is forced to flow over the molding surface to thereby exhibit a grain pattern close to the natural grain.

Also, in this case, by melting one wood-like aspect forming material pellet, adding other at least one wood-like aspect forming material pellet thereto, and molding the mixture before those pellets are completely mixed together, the grain pattern close to the natural grain can be created intentionally.

Further, in the above case where the wood-like aspect forming pellet in which the fixed particles 110, 120 are mixed with a resin and a pigment is prepared in plural kinds, and two or more kinds of these wood-like aspect forming pellets containing different pigments are mixed together and melted to be molded into the desire shape by extrusion or injection molding, the melting temperatures of the wood-like aspect forming pellets to be mixed may be changed for each pellet. By setting the temperature for melting the pellets that is just enough to melt the wood-like aspect forming pellet having the lower melting temperature, the wood-like aspect forming pellet having the higher melting temperature is not completely melted. Therefore, the pigments in both the wood-like aspect forming pellets are also not completely mixed with each other and, during the molding, these pigments not being completely mixed exhibit a stripe pattern. As a result, the grain pattern very close to the natural grain can be formed.

Similarly, where the wood-like aspect forming pellet in which the fixed particles 110, 120 are mixed with a resin and a pigment is prepared in plural kinds, and two or more kinds of these wood-like aspect forming pellets containing different pigments are mixed together and melted to be molded into the desire shape by extrusion or injection molding, those wood-like aspect forming pellets mixed together may be selected to have different fluidity when melted. By so selecting, the wood-like aspect forming pellets become hard to completely mix with each other and, during the molding, the pigments in the wood-like aspect forming pellets not being completely mixed exhibit a stripe pattern. As a result, the grain pattern very close to the natural grain can be formed.

Fifth shaping method

A ground material pellet in which the fixed particles 110, 120 are mixed with a resin and a wood-like aspect forming material pellet in which the fixed particles 110, 120 are mixed with a resin and a pigment are mixed together and employed for the molding.

In this case, after preparing the ground material pellet in which the fixed particles 110, 120 are mixed with a resin and the wood-like aspect forming material pellet in which the fixed particles 110, 120 are mixed with a resin and a pigment, and then mixing the ground material pellet and the wood-like aspect forming material pellet together, the mixture can be melted and molded into the desired shape by extrusion or injection molding. When the molding is performed in condition that both the pellets are not completely mixed together, the pigment in the wood-like aspect forming material pellet is also not completely mixed and, during the molding, the pigment not completely mixed exhibits a stripe pattern. As a result, the grain pattern very close to the natural grain can be formed.

In the above case, the melting temperature of the wood-like aspect forming material pellet may be selected to be higher than that of the ground material pellet. By setting the temperature for melting the pellets that is just enough to melt the ground material pellet having the lower melting temperature, the wood-like aspect forming pellet having the higher melting temperature is not completely melted. Therefore, the pigment in the wood-like aspect forming pellet is also not completely mixed and, during the molding, the pigment not being completely mixed exhibits a stripe pattern, whereby the grain pattern very close to the natural grain can be formed.

Figure 7:
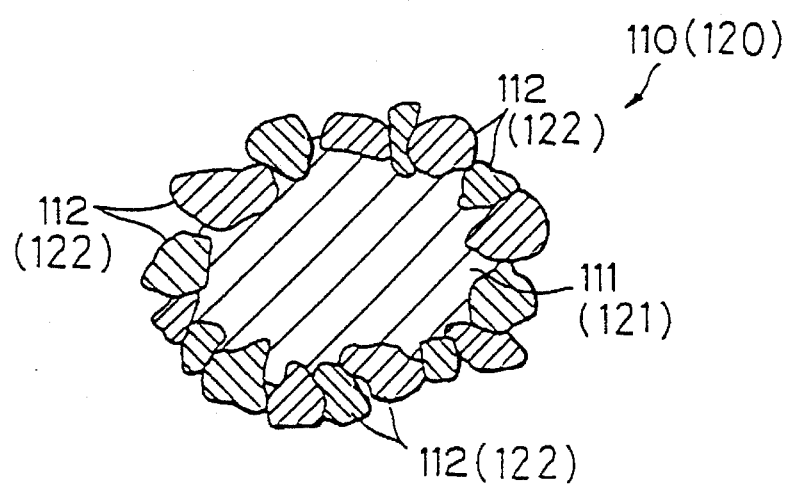
FIG. 7 is a sectional view of one powdery particle in a state where a white inorganic pigment is fixed thereto to form a fixed particle.

To describe in more detail, as shown in FIG. 7, the fixed particles 110, 120 include white inorganic pigment particles, as the surface particles 112, 122, fixed to the surfaces of the powdery particles 111, 121. This type of the fixed particles 110, 120 exhibit substantially the same color tone as that of the white inorganic pigment, and agglomeration of the fixed particles 110, 120 was found during neither production nor storage thereof.

The amount of white inorganic pigment fixed has an upper limit at which the pigment particles are just enough to cover all over the circumferential surfaces of the powdery particles 111, 121, as basic particles, in a mutually overlapped relation. A lower limit of the pigment amount is optionally determined depending on the desired hue of a wooden-like product to be manufactured.

The fixed particles 110, 120) thus obtained and the resin are mixed with each other at a proper ratio, e.g., fixed particles:resin=in the range of about 10:90 to 50:50 by weight, preferably fixed particles:resin=about 30:70. The mixture is formed into a pellet to thereby provide the ground material pellet. If the fixed particles 110, 120 are not greater than 10 wt %, a wood-like feeling would disappear and if not less than 50 wt %, fluidity during the molding would be too deteriorated to allow the practical use.

The above pellet forming step is carried out by, for example, known conventional means for extruding the mixture from a multi-hole circular nozzle in the form of strings and then cutting the extruded mixture.

The wood-like aspect forming material pellet is prepared by mixing the fixed particles 110, 120, which have been subjected to the trituration process and include the white inorganic pigment fixed to the surfaces thereof, with a resin and a colored pigment and forming the mixture into pellet. The wood-like aspect forming material pellet has its melting temperature higher than that of the ground material pellet.

More specifically, the reel ting temperature is selected beforehand such that the wood-like aspect forming material pellet has the melting temperature (°C.) about 3% higher than that of the ground material pellet; e.g., if the melting temperature of the ground material pellet is 180° C., the melting temperature of the wood-like aspect forming material pellet is set to about 185° C. To set the melting temperature of the wood-like aspect forming material pellet to be higher than that of the ground material pellet, the method of adding a well-known adder adapted to raise the melting temperature, or of selecting the resin grade which provides the higher melting temperature, as described later, can be employed.

As the resin contained in the pellet is used any of the resins used for the ground material pellet, i.e., vinyl chloride resin, polyethylene resin, polypropyrene resin or the like. It is naturally desirable that the resin selected for the wood-like aspect forming material pellet be the same kind as that used for the ground material pellet. As to the resin grade, different grades may be selected for both the pellets so that the wood-like aspect forming material pellet finally obtained has the melting temperature higher than that of the ground material pellet.

The fixed particles 110, 120 which have been subjected to the trituration process and include the white inorganic pigment fixed to the surfaces thereof, for use in the wood-like aspect forming material pellet, are processed in a like manner to those used for the ground material pellet.

As to a colored pigment, one or more kinds of inorganic pigments such as iron oxide, cadmium yellow and carbon black are optionally selected depending on the desired hue, i.e., the color of texture of a final product, and the color of wood grain described later.

Then, the fixed particles 110, 120, powder of the resin and the colored pigment are mixed with each other at a proper ratio, and the mixture is formed into a pellet to thereby provide the wood-like aspect forming material pellet. The mixing ratios of the respective components are selected such that the weight ratio of the fixed particles to the resin powder is set to fall in the range similar to that described above for the ground the material pellet, and the ratio of the colored pigment the total weight is set to fall in the range of about 0.1 to 30 wt %.

The pellet forming step is carried out by known conventional means as with the ground material pellet.

The ground material pellet and the wood-like aspect forming material pellet are mixed together, and the pellet mixture is molded by extrusion or injection molding into the desired shape corresponding to, e.g., verandah boards and plinths for housings, various facing plates for furnitures or the like, and interior finish members for vehicles. A wooden-like product of the present invention is thereby obtained.

The mixing ratio of the ground material pellet and the wood-like aspect forming material pellet is optionally determined depending on the hue of the final product and the proportion of the colored pigment in the wood-like aspect forming material pellet. Usually, the ratio of ground material pellet:wood-like aspect forming material pellet=50:50 to 99:1 (by weight) is employed.

When the mixture of both the pellets is molded by extrusion or injection molding, the molding temperature is set beforehand in accordance with the melting temperature of the ground material pellet, and the molding time is also set in accordance with the ground material pellet. By carrying out the molding under such conditions, the ground material pellet is normally melted to uniformly flow in the molding direction. On the other hand, because of having the higher melting temperature, the wood-like aspect forming material pellet is also melted but not sufficiently as compared with the ground material pellet and, therefore, the melted pellet does not flow well and uniformly.

Figure 8:
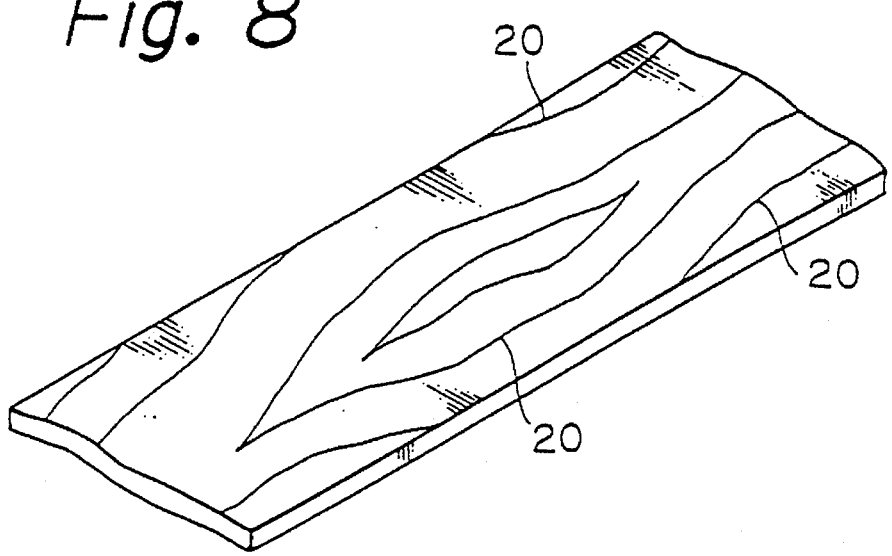
FIG. 8 is a side sectional enlarged view of a resultant molding (product).
Figure 9:
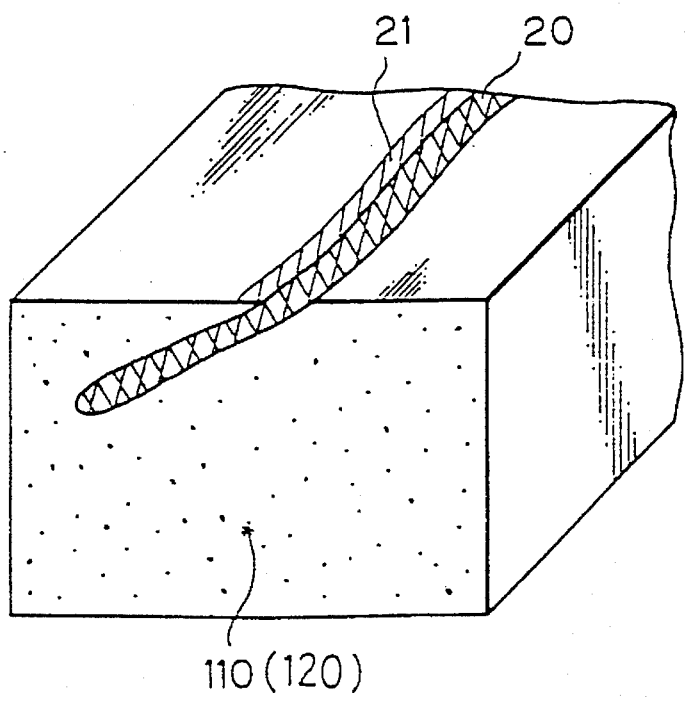
FIG. 9 is a perspective view showing a surface condition of a resultant molding (product).

Owing to such a non-smooth and uneven flow, the colored pigment in the wood-like aspect forming material pellet also does not flow uniformly. In the resultant molding, therefore, a colored portion 20 due to the colored pigment is scatteredly created in its internal portion and surface layer, as shown in FIG. 8. Also, on the molding surface, the colored pigment flows unevenly in the molding direction and, as shown in FIG. 9, the colored portion 20 appears in the form of a stripe which provides a pattern very close to the natural grain. In the surface layer of the molding, particularly, if the powdery particles 111, 121 bearing the white pigment thereon which is contained in the ground material pellet or the wood-like aspect forming material pellet come to lie over the colored portion 20, the color of the colored portion 20 is concealed by the white pigment borne on the powdery particles 111, 121. Accordingly, there produce an area where the colored portion 20 appears perfectly, an area where the colored portion 20 is hidden by the white pigment, and a half-tone area 21 where the colored portion 20 appears lightly. Combination of these areas causes uneven tints to appear on the molding surface around the colored portion 20 (stripe-shaped pattern), as shown in FIG. 9. As a result, the colored portion 20 becomes still closer to the natural grain.

Such a wooden-like product is easily produced by mixing the ground material pellet and the wood-like aspect forming material pellet at a proper ratio corresponding to the desired hue, and molding the mixture by extrusion or injection molding. In the resultant product, not only a stripe-shaped grain pattern appears in varying tints, but also the colored pigment in the wood-like aspect forming material pellet flows unevenly in a ground area of the molding, thus producing the tint varied non-artificially. As a result, the product exhibits wood-like aspects extremely close to natural wood as a whole.

Similarly, by selecting the fluidity of the wood-like aspect forming material pellet to be lower than that of the ground material pellet when reel ted, both the pellets become hard to completely mix with each other and, during the molding, the pigment in the wood-like aspect forming material pellet not being completely mixed exhibits a stripe pattern, whereby the grain pattern very close to the natural grain can be formed.

Sixth shaping method

A resin pellet made of a resin only, a ground material pellet in which the fixed particles 110, 120 are mixed with a resin, and a wood-like aspect forming material pellet in which the fixed particles 110, 120 are mixed with a resin and a pigment are mixed together and employed for the molding.

Thus, after preparing the resin pellet made of a resin only, the ground material pellet in which the fixed particles 110, 120 are mixed with a resin, and the wood-like aspect forming material pellet in which the fixed particles 110, 120 are mixed with a resin and a pigment, and then mixing the resin pellet, the ground material pellet and the wood-like aspect forming material pellet together, the mixture can be melted and molded into the desired shape by extrusion or injection molding. In this case, too, when the molding is performed in condition that the pellets are not completely mixed together, the pigment in the wood-like aspect forming material pellet is also not completely mixed and, during the molding, the pigment not completely mixed exhibits a stripe pattern. As a result, the grain pattern very close to the natural grain can be formed.

Seventh shaping method

A ground material pellet in which the fixed particles 110, 120 are mixed with a resin and a pigment pellet in which a resin and a pigment are mixed with each other are mixed together and employed for the molding.

Thus, after preparing the ground material pellet in which the fixed particles 110, 120 are mixed with a resin, and the pigment pellet in which a resin and a pigment mixed with each other, and then mixing the ground material pellet and the pigment pellet together, the mixture can be melted and molded into the desired shape by extrusion or injection molding. In this case, too, when the molding is performed in condition that both the pellets are not completely mixed together, the pigment in the pigment pellet is also not completely mixed and, during the molding, the pigment not completely mixed exhibits a stripe pattern. As a result, the grain pattern very close to the natural grain can be formed.

Eighth shaping method

A wood-like aspect forming material pellet in which the fixed particles 110, 120 are mixed with a resin and a pigment and a pigment pellet in which a resin and a pigment are mixed with each other are mixed together and employed for the molding.

Thus, after preparing the wood-like aspect forming material pellet in which the fixed particles 110, 120 mixed with a resin and a pigment and the pigment pellet in which a resin and a pigment are mixed with each other, and then mixing the wood-like aspect forming material pellet and the pigment pellet together, the mixture can be melted and molded into the desired shape by extrusion or injection molding. In this case, too, when the molding is performed in condition that both the pellets are not completely mixed together, the pigment in the wood-like aspect forming material pellet or the pigment in the pigment pellet is also not completely mixed and, during the molding, the pigment not completely mixed exhibits a complicated stripe pattern. As a result, the grain pattern very close to the natural grain can be formed.

Ninth shaping method

A wood-like aspect forming material pellet in which the fixed particles 110, 120 are mixed with a resin and a pigment and a wood-like aspect forming material compound in which the fixed particles 110, 120 are mixed with a resin and a pigment are mixed together and employed for the molding.

Thus, after preparing the wood-like aspect forming material pellet in which the fixed particles 110, 120 are mixed with a resin and a pigment and the wood-like aspect forming material compound in which the fixed particles 110, 120 are mixed with a resin and a pigment, and then mixing the wood-like aspect forming material pellet and the wood-like aspect forming material compound together, the mixture can be melted and molded into the desired shape by extrusion or injection molding. In this case, too, when the molding is performed in condition that the wood-like aspect forming material pellet and the wood-like aspect forming material compound are not completely mixed together, the pigment in the wood-like aspect forming material pellet or the pigment in the wood-like aspect forming material compound is also not completely mixed and, during the molding, the pigment not completely mixed exhibits a complicated stripe pattern. As a result, the grain pattern very close to the natural grain can be formed.

Tenth shaping method

A wood-like aspect forming material pellet in which the fixed particles 110, 120 are mixed with a resin and a pigment and a ground material compound in which the fixed particles 110, 120 are mixed with a resin are mixed together and employed for the molding.

Thus, after preparing the wood-like aspect forming material pellet in which the fixed particles 110, 120 are mixed with a resin and a pigment and the ground material compound in which the fixed particles 110, 120 are mixed with a resin, and then mixing the wood-like aspect forming material pellet and the ground material compound together, the mixture can be melted and molded into the desired shape by extrusion or injection molding. In this case, too, when the molding is performed in condition that the wood-like aspect forming material pellet and the ground material compound are not completely mixed together, the pigment in the wood-like aspect forming material pellet is also not completely mixed and, during the molding, the pigment not completely mixed exhibits a complicated stripe pattern. As a result, the grain pattern very close to the natural grain can be formed.

Eleventh shaping method

A wood-like aspect forming material pellet in which the fixed particles 110, 120 are mixed with a resin and a pigment and a pigment compound in which a resin and a pigment are mixed with each other are mixed together and employed for the molding.

Thus, after preparing the wood-like aspect forming material pellet in which the fixed particles 110, 120 are mixed with a resin and a pigment and the pigment pellet in which a resin and a pigment are mixed with each other, and then mixing the wood-like aspect forming material pellet and the pigment pellet together, the mixture can be melted and molded into the desired shape by extrusion or injection molding. In this case, too, when the molding is performed in condition that both the pellets are not completely mixed together, the pigment in the wood-like aspect forming material pellet or the pigment in the pigment pellet is also not completely mixed and, during the molding, the pigment not completely mixed exhibits a complicated stripe pattern. As a result, the grain pattern very close to the natural grain can be formed.

Twelfth shaping method

A ground material pellet in which the fixed particles 110, 120 are mixed with a resin and a wood-like aspect forming material compound in which the fixed particles 110, 120 are mixed with a resin and a pigment are mixed together and employed for the molding.

Thus, after preparing the ground material pellet in which the fixed particles 110, 120 are mixed with a resin and the wood-like aspect forming material compound in which the fixed particles 110, 120 are mixed with a resin and a pigment, and then mixing the ground material pellet and the wood-like aspect forming material compound together, the mixture can be melted and molded into the desired shape by extrusion or injection molding. In this case, too, when the molding is performed in condition that the ground material pellet and the wood-like aspect forming material compound are not completely mixed together, the pigment in the wood-like aspect forming material compound is also not completely mixed and, during the molding, the pigment not completely mixed exhibits a complicated stripe pat tern. As a result, the grain pattern very close to the natural grain can be formed.

Thirteenth shaping method

A ground material pellet in which the fixed particles 110, 120 are mixed with a resin and a pigment compound in which a resin and a pigment are mixed with each other are mixed together and employed for the molding.

Thus, after preparing the ground material pellet in which the fixed particles 110, 120 are mixed with a resin and the pigment compound in which a resin and a pigment are mixed with each other, and then mixing the ground material pellet and the pigment compound together, the mixture can be melted and molded into the desired shape by extrusion or injection molding. In this case, too, when the molding is performed in condition that the ground material pellet and the pigment compound are not completely mixed together, the pigment in the pigment compound is also not completely mixed and, during the molding, the pigment not completely mixed exhibits a stripe pattern. As a result, the grain pattern very close to the natural grain can be formed.

Fourteenth shaping method

A pigment pellet in which a resin and a pigment are mixed with each other and a wood-like aspect forming material compound in which the fixed particles 110, 120 are mixed with a resin and a pigment are mixed together and employed for the molding.

Thus, after preparing the pigment pellet in which a resin and a pigment are mixed with each other and the wood-like aspect forming material compound in which the fixed particles 110, 120 are mixed with a resin and a pigment, and then mixing the pigment pellet and the wood-like aspect forming material compound together, the mixture can be melted and molded into the desired shape by extrusion or injection molding. In this case, too, when the molding is performed in condition that the pigment pellet and the wood-like aspect forming material compound are not completely mixed together, the pigment in the pigment pellet or the pigment in the wood-like aspect forming material compound is also not completely mixed and, during the molding, the pigment not completely mixed exhibits a complicated stripe pattern. As a result, the grain pattern very close to the natural grain can be formed.

As described above, in order to that the pigment not completely mixed exhibits a stripe pattern during the molding so as to form a grain pattern very close to the natural grain, the shaping or molding conditions are set beforehand such that the pigment in the pellet or compound flows irregularly through the melted material during molding, rather than regularly or uniformly, thereby forming the stripe-shaped colored portions 20. The resultant stripe-shaped colored portions 20 creates the grain pattern very close to the natural grain.

Further, by fixing a white inorganic pigment to the surfaces of the pulverized dust 102 in the pellet or compound, when the surface of the pulverized dust 102 lies over the colored pigment in the resultant molding, the color of the underlying pigment is concealed so that the colored portions 20 formed by the colored pigment on the molding surface is quite uneven in tint and thickness. Accordingly, the grain pattern becomes still closer to the natural grain.

The wooden-like product molded as above has not only a touch feeling of wood, but also an outer appearance like wood because, depending on the condition during the molding, the colored pigment creates the colored portions 20 on the molding surface which are recognized like the natural grain.

In any of the above various shaping methods, using plural kinds of pigments results in that the stripe-shaped pattern drawn by the pigments not being completely mixed during the molding is more complicated and the grain pattern formed becomes still closer to the natural grain. Accordingly, it is effective to employ not more than one kinds of pigments in achieving the wooden-like molding product which is as close as possible to natural wood in both a touch feeling and an outer appearance.

The fixed particles 110, 120 comprise the powdery particles 111, 121 formed of a cellulose material and hence are apt to absorb moisture. If the fixed particles 110, 120 absorbing moisture are subjected to the molding, the moisture would be foamed to cause a failure in the molding. For that reason, it is desirable that the pellet or compound in which the fixed particles 110, 120 are mixed be dried before the molding. From this viewpoint, the drying operation can be facilitated by reducing the amount of the pellet or compound in which the fixed particles 110, 120 are mixed. Comparing the fifth shaping method and the sixth shaping method on an assumption that the same amount of the fixed particles 110, 120 are mixed, for example, the same amount of the fixed particles 110, 120 is obtained when the ground material pellet in the fifth shaping method is melted and when the resin pellet and the ground material pellet in the sixth shaping method are both melted. In terms of amount, therefore, the ground material pellet in the sixth shaping method is required in less amount than the ground material pellet in the fifth shaping method. Thus, the drying operation before the molding can be facilitated by employing the sixth shaping method.

In the above description, since the fixed particles 110, 120 including the inorganic pigment fixed thereto and making up the pellet or compound are subjected to the trituration process, the fixed particles 110, 120 have less projecting portions on the surfaces thereof and have a more granular shape as opposed to conventional wood dust or particles which are obtained by directly triturating wood and have many whisker-like projecting portions. Therefore, the surface of the resultant molding (product) is less happy and provides a better touch feeling.

Further, since the fixed particles 110, 120 are granular in shape, expansion or contraction caused by absorbing or releasing water (including moisture) and the solvent is significantly reduced as compared with conventional fiber-like wood dust. As a result, the wooden-like product containing the fixed particles 110, 120 is very superior in dimensional stability.

Also, since the fixed particles 110, 120 which have been subjected to the trituration process and include the inorganic pigment fixed to the surfaces thereof serve as aggregates, adsorption and absorption of the resin by the fixed particles 110, 120 are so small that no appreciable molding distortions are caused.

In the inventive wooden-like product, since the inorganic pigment is fixed to the surfaces of the powdery particles 111, 121, the fixed particles 110, 120 have higher heat resistance than the powdery particles themselves. Accordingly, thermal influences during the molding becomes smaller than would be the case of simply mixing and molding the powdery particles 111, 121 as such. As a result, denaturation of the product such as changes in color and shape is suppressed. Additionally, since a pigment is fixed as the surface particles so as to cover the surfaces of the powdery particles 111, 121, lignin and wood vinegar contained in the powdery particles are suppressed from releasing during the molding. Therefore, a failure in the molding due to release of lignin and wood vinegar is prevented.

INDUSTRIAL APPLICABILITY

The present invention is applied to a method of manufacturing a product having wood-like aspects, such as various wooden-like products including, e.g., verandah boards, plinths and rain-wather gutters for housings, various facing plates for furnitures or the like, and interior finish members for vehicles, and to such product.

We claim:

1. A simulated wood product manufacturing method comprising subjecting pulverized dust obtained by pulverizing a cellulose material to a trituration process to produce powdery particles having an increased bulk specific gravity, fixing surface particles smaller in size and harder than said powdery particles to outer circumferential surfaces of said powdery particles to produce fixed particles, mixing a resin and a pigment with said fixed particles, and melting a resultant mixture to be later or simultaneously molded into a desired shape by extrusion or injection molding.

2. A simulated wood product manufacturing method according to claim 1, wherein said cellulose material is wood.

3. A simulated wood product manufacturing method according to claim 1 or 2, wherein said trituration process is performed by a ball mill using pulverizing balls.

4. A simulated wood product manufacturing method according to claim 1 or 2, wherein said surface particles are made of at least one material selected from the group consisting of inorganic, metallic and plastic materials.

5. A simulated wood product manufacturing method according to claim 1 or 2, wherein said surface particles comprise a white inorganic pigment.

6. A simulated wood product manufacturing method according to claim 1 or 2, wherein said fixed particles are mixed with a resin and a pigment to form a mixture which is pelletized to form a simulated wood pellet, a different pigment from that mixed in said simulated wood pellet is added to said simulated wood pellet, and a resultant mixture is melted to be later or simultaneously molded into a desired shape by extrusion or injection molding.

7. A simulated wood product manufacturing method according to claim 1 or 2, wherein a first portion of said fixed particles is mixed with a resin and a pigment to form a mixture which is pelletized to form a first simulated wood pellet, a second portion of said fixed particles is mixed with said resin and a different pigment to form a second simulated wood pellet; mixing said first and second simulated wood pellets to form a mixture which is melted to be later or simultaneously molded in a desired shape by extrusion or injection molding.

8. A simulated wood product manufacturing method according to claim 7, wherein said first and second simulated wood pellets are melted at different temperatures.

9. A simulated wood product manufacturing method according to claim 7, wherein said first and second simulated wood pellets possess a different melt viscosity.

10. A simulated wood product manufacturing method according to claim 1 or 2, wherein a ground material pellet is prepared by mixing said fixed particles with a resin, and a simulated wood pellet is prepared by mixing said fixed particles with a resin and a pigment, and said ground material pellet and said simulated wood pellet are mixed together and melted to be later or simultaneously molded into a desired shape by extrusion or injection molding.

11. A simulated wooden product manufacturing method according claim 10, wherein a melting temperature of said simulated wood pellet is higher than that of said ground material pellet.

12. A simulated wood product manufacturing method according to claim 10, wherein said simulated wood pellet has a lower fluidity than that of said ground material pellet when melted.

13. A simulated wood product manufacturing method according to claim 1 or 2, wherein a resin pellet made of a resin only, a ground material pellet in which said fixed particles are mixed with a resin, and a simulated wood pellet in which said fixed particles are mixed with a resin and a pigment are prepared, and said resin pellet, said ground material pellet and said simulated wood pellet are mixed together and melted to be later or simultaneously molded into a desired shape by extrusion or injection molding.

14. A simulated wood product manufacturing method according to claim 1 or 2, wherein a ground material pellet is prepared by mixing said fixed particles with a resin, and a pigment pellet is prepared by mixing a resin and a pigment, and said ground material pellet and said pigment pellet are mixed together and melted to be later or simultaneously molded into a desired shape by extrusion or injection molding.

15. A simulated wood product manufacturing method according to claim 1 or 2, wherein a simulated wood pellet is prepared by mixing said fixed particles with a resin and a pigment, and a pigment pellet is prepared by mixing a resin and a pigment, and said simulated wood pellet and said pigment pellet are mixed together and melted to be later or simultaneously molded into a desired shape by extrusion or injection molding.

16. A simulated wood product manufacturing method according to claim 1 or 2, wherein a simulated wood pellet is prepared by mixing said fixed particles with a resin and a pigment to form a mixture which is pelletized to form a simulated wood pellet, and a simulated wood compound is prepared by mixing said fixed particles with a resin and a pigment, and said simulated wood pellet and said simulated wood compound are mixed together and melted to be later or simultaneously molded into a desired shape by extrusion or injection molding.

17. A simulated wood product manufacturing method according to claim 1 or 2, wherein a simulated wood pellet is prepared by mixing said fixed particles with a resin and a pigment, and a ground material compound is prepared by mixing said fixed particles with a resin, and said simulated wood pellet and said ground material compound are mixed together and melted to be later or simultaneously molded into the a desired shape by extrusion or injection molding.

18. A simulated wood product manufacturing method according to claim 1 or 2, wherein a simulated wood pellet is prepared by mixing said fixed particles with a resin and a pigment, and a pigment compound is prepared by mixing a resin and a pigment, and said simulated wood pellet and said pigment compound are mixed together and melted to be later or simultaneously molded into a desired shape by extrusion or injection molding.

19. A simulated wood product manufacturing method according to claim 1 or 2, wherein a ground material pellet is prepared by mixing said fixed particles with a resin, and a simulated wood compound is prepared by mixing said fixed particles with a resin and a pigment, and said ground material pellet and said simulated wood compound are mixed together and melted to be later or simultaneously molded into a desired shape by extrusion or injection molding.

20. A simulated wood product manufacturing method according to claim 1 or 2, wherein a ground material pellet is prepared by mixing said fixed particles with a resin, and a pigment compound is prepared by mixing a resin and a pigment, and said ground material pellet and said pigment compound are mixed together and melted to be later or simultaneously molded into a desired shape by extrusion or injection molding.

21. A simulated wood product manufacturing method according to claim 1 or 2, wherein a pigment pellet is prepared by mixing a resin and a pigment, and a simulated wood compound in which said fixed particles are mixed with a resin and a pigment, and said pigment pellet and said simulated wood compound are mixed together and melted to be later or simultaneously molded into a desired shape by extrusion or injection molding.

22. A simulated wood product wherein pulverized dust obtained by pulverizing a cellulose material is subjected to a trituration process to produce powdery particles having an increased bulk specific gravity, surface particles smaller in size and harder than said powdery particles are fixed to outer circumferential surfaces of said powdery particles to produce fixed particles, a resin and a pigment are mixed with said fixed particles, and a resultant melted mixture is molded into a desired shape by extrusion or injection molding.

23. A simulated wood product manufacturing method according to claim 7, wherein a third portion of said fixed particles is mixed with a resin and a third pigment to form a third simulated wood pellet which is mixed with said first and second simulated wood pellets to form a mixture which is melted to be later or simultaneously molded in a desired shape by extrusion or injection molding.

* * * * *